(12) United States Patent
Brinkerhoff

(10) Patent No.: US 9,994,415 B2
(45) Date of Patent: Jun. 12, 2018

(54) HITCH ATTACHMENT

(71) Applicant: Brink Industries LLC, Saint George, UT (US)

(72) Inventor: Ryan Brinkerhoff, Saint George, UT (US)

(73) Assignee: Brink Industries LLC, Saint George, UT (US)

(*) Notice: Subject to any disclaimer, the term of this patent is extended or adjusted under 35 U.S.C. 154(b) by 90 days.

(21) Appl. No.: 14/685,244

(22) Filed: Apr. 13, 2015

(65) Prior Publication Data

US 2016/0090266 A1 Mar. 31, 2016

Related U.S. Application Data

(60) Provisional application No. 62/071,564, filed on Sep. 26, 2014.

(51) Int. Cl.
*B60D 1/24* (2006.01)
*B65H 49/32* (2006.01)
*B60R 9/06* (2006.01)

(52) U.S. Cl.
CPC ............ *B65H 49/32* (2013.01); *B60D 1/241* (2013.01); *B60R 9/06* (2013.01); *B65H 49/327* (2013.01); *B65H 2701/36* (2013.01)

(58) Field of Classification Search
CPC .. B60D 1/241; B60D 1/28; B60D 1/52; Y10T 403/7041; Y10T 403/7056; B65H 49/32;
(Continued)

(56) References Cited

U.S. PATENT DOCUMENTS 5,344,175 A * 9/1994 Speer .................. B60D 1/58
224/521
5,411,232 A * 5/1995 Hufford ............... F16B 7/0413
248/230.1
(Continued)

FOREIGN PATENT DOCUMENTS

WO WO2004041591 A2 5/2004
WO WO2004041591 A3 5/2004

OTHER PUBLICATIONS

"Hitch Vise Mount—Vise Mount for Truck Hitch—American Van Equipment—Ladder", Retrieved on May 16, 2012, 2 Pages.
(Continued)

*Primary Examiner* — Scott McNurlen
(74) *Attorney, Agent, or Firm* — Jared S. Goff; Goff IP Law PLLC

(57) ABSTRACT

A hitch attachment system can include a hitch attachment configured to be secured to a vehicle hitch and one or more implements configured to be attached to a vehicle hitch. For example, the implement may be a wire rack, a vise stand, or some other implement. A securing mechanism can be configured to apply pressure transverse to a direction of sliding motion of the hitch attachment relative to the implement to inhibit movement of the implement relative to the hitch. The hitch attachment may include a stabilizing system that is configured to move a pressure member to apply pressure to an inwardly-facing surface of the hollow tubing to inhibit movement of the hitch attachment relative to the hitch.

19 Claims, 17 Drawing Sheets

(58) Field of Classification Search
CPC .... B65H 49/327; B65H 2701/36; B60R 9/06; B60R 9/065
USPC .......... 280/506–507; 224/519–521; 403/362–363, 366, 374.3, 377
See application file for complete search history.

(56) References Cited

U.S. PATENT DOCUMENTS

| | | | |
|---|---|---|---|
| 5,568,900 A | 10/1996 | Conroy | |
| 5,752,639 A | 5/1998 | Rice | |
| 5,775,560 A | 7/1998 | Zahn et al. | |
| 5,938,092 A | 8/1999 | Johnson | |
| 5,950,617 A | 9/1999 | Lorenz | |
| 6,390,344 B1 * | 5/2002 | Edgerly | B60R 9/06 224/402 |
| 6,511,088 B2 | 1/2003 | Kahlstorf | |
| 6,662,983 B2 | 12/2003 | Lane et al. | |
| 6,951,287 B1 * | 10/2005 | Randazzo | B60R 9/06 211/17 |
| 6,974,147 B1 * | 12/2005 | Kolda | B60D 1/52 280/506 |
| 7,004,491 B1 * | 2/2006 | Allsop | B60D 1/52 280/491.2 |
| 7,090,104 B2 | 8/2006 | Dorety | |
| 7,419,347 B1 | 9/2008 | Cormier | |
| 7,600,774 B1 * | 10/2009 | Speer | B60D 1/155 280/493 |
| 8,070,028 B2 | 12/2011 | Segeren et al. | |
| 8,419,041 B2 * | 4/2013 | Bessette | B60D 1/06 280/506 |
| 8,696,011 B2 * | 4/2014 | Despres | B60D 1/06 280/478.1 |
| 9,376,063 B2 * | 6/2016 | Hein | B60R 9/06 |
| 2006/0186638 A1 * | 8/2006 | Varner | A63B 71/023 280/506 |
| 2007/0108246 A1 | 5/2007 | Jennings et al. | |
| 2010/0294819 A1 | 11/2010 | Spera | |
| 2011/0278336 A1 | 11/2011 | Landrum | |
| 2015/0343866 A1 * | 12/2015 | Williams | B60D 1/52 29/525.04 |

OTHER PUBLICATIONS

Brinkerhoff, Ryan, "Statement by Ryan Brinkerhoff", Dated Aug. 24, 2015, 4 Pages.

\* cited by examiner

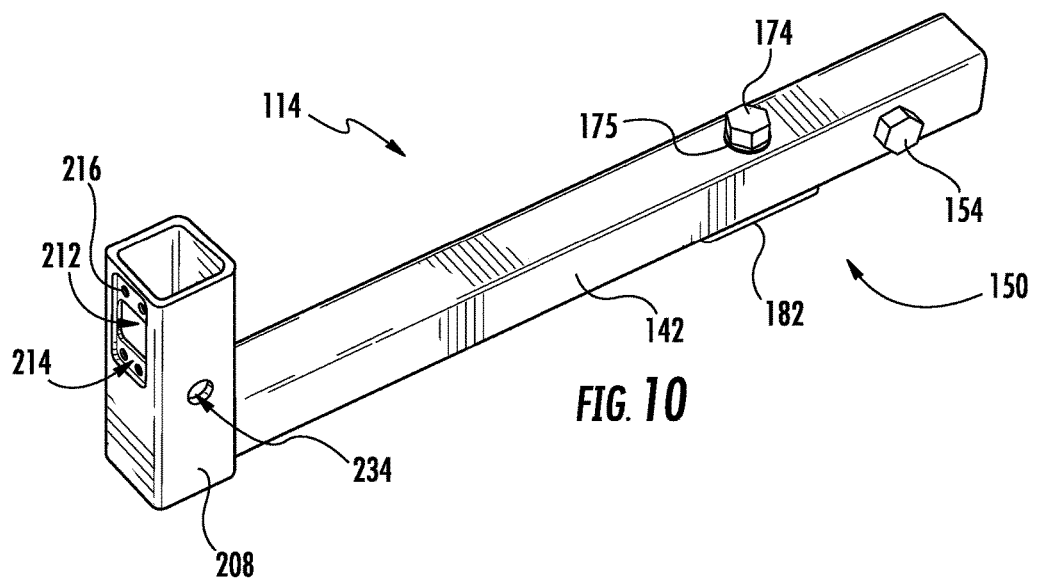
FIG. 10
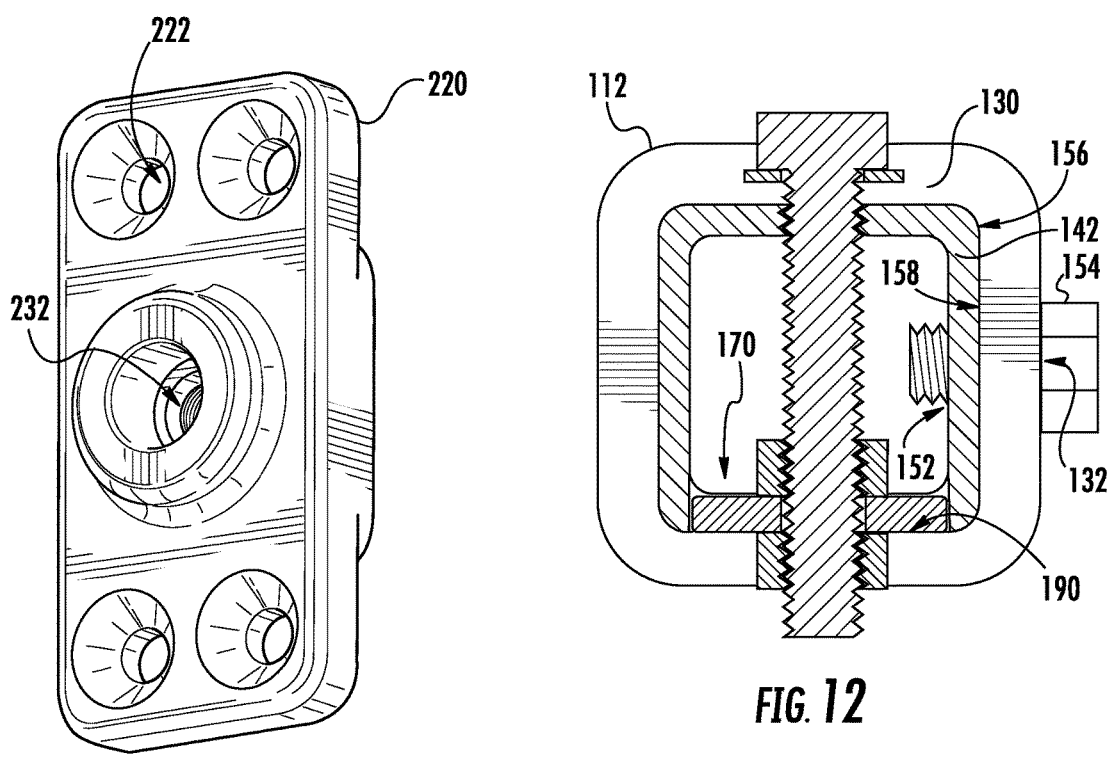
FIG. 11
FIG. 12

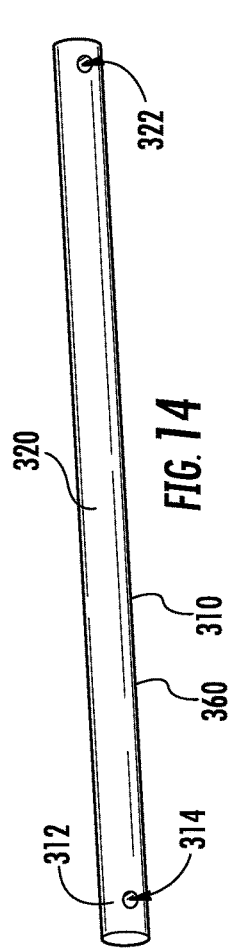
FIG. 14
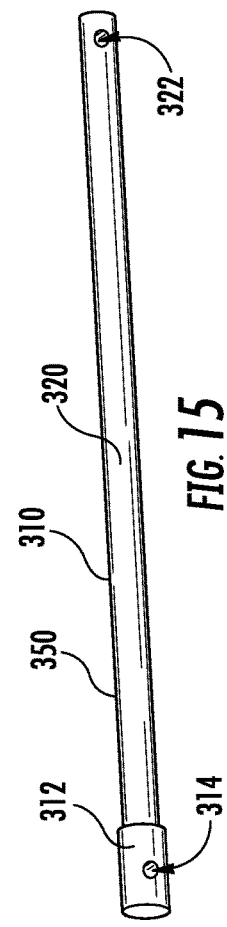
FIG. 15
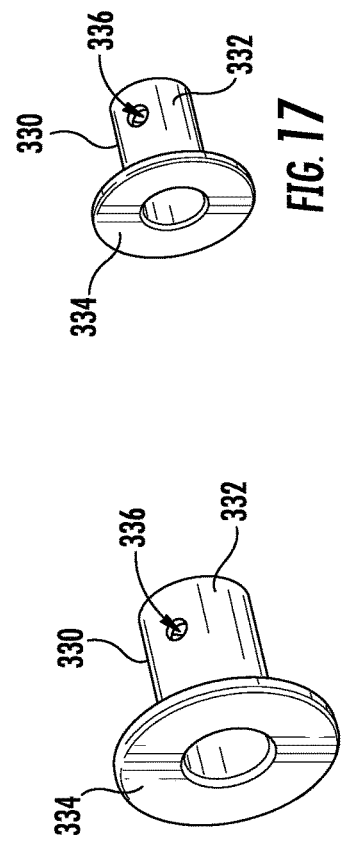
FIG. 16
FIG. 17
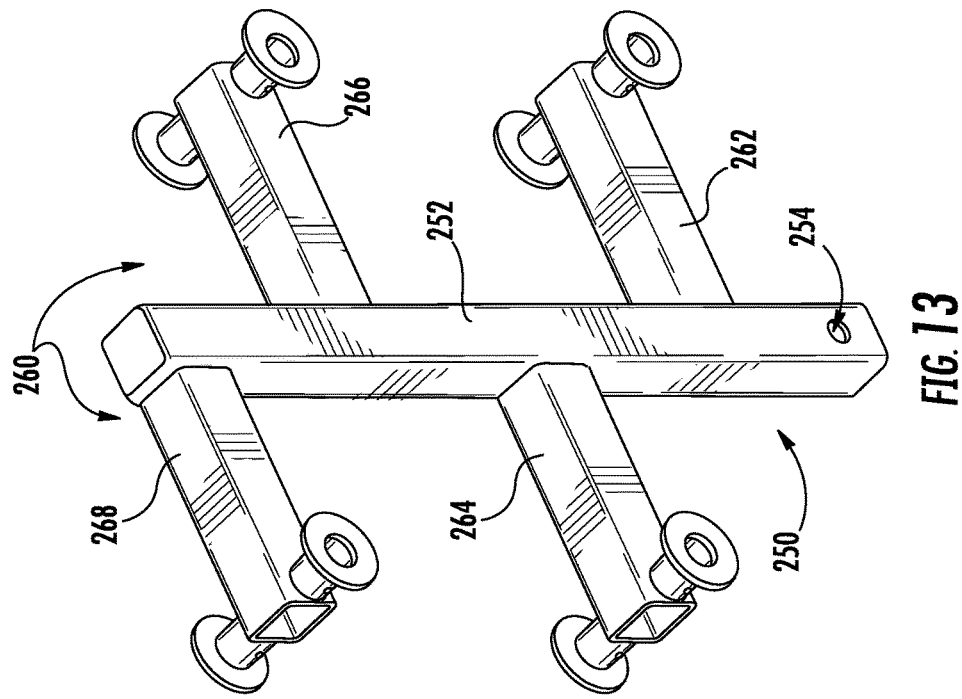
FIG. 13

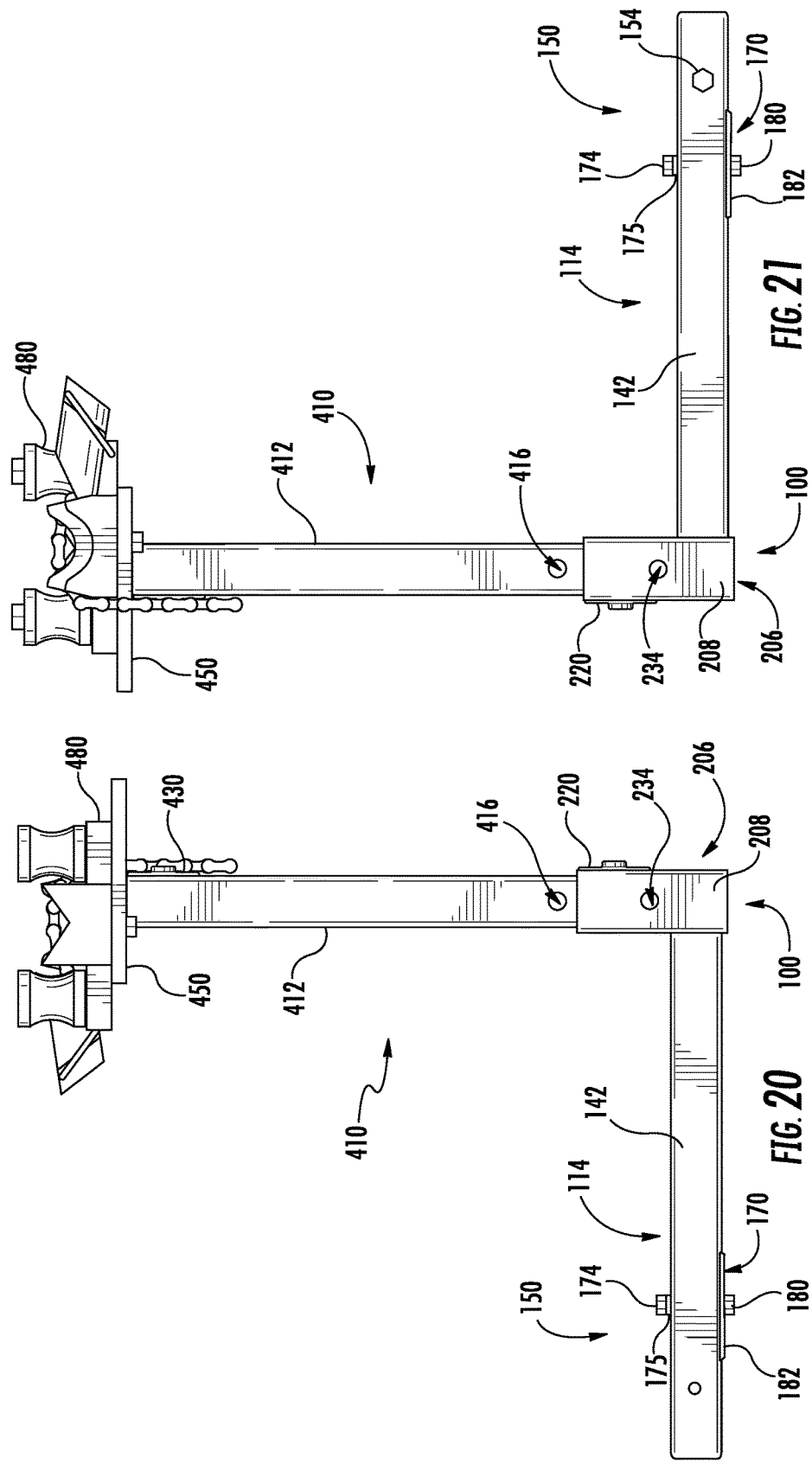

HITCH ATTACHMENT

RELATED APPLICATIONS

The present application is a non-provisional application claiming priority to U.S. Provisional Patent Application No. 62/071,564, filed Sep. 26, 2014, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

A vehicle hitch can include a tubular member to which various implements, such as bicycle racks or luggage racks, may be attached. Specifically, such an implement may include a hitch attachment in the form of a bar that extends into the tubular member of the hitch. A standard vehicle hitch tubular member includes a transversely extending hole through the tubular member to allow a pin to be inserted through the tubular member and through a hole in a bar of the implement. With the pin passing through the tubular member and the bar, the bar of the hitch attachment is prevented from slipping out of the tubular member.

SUMMARY

Tools and techniques discussed herein can allow for one or more useful implements to be attached to a vehicle hitch.

For example, according to one aspect, the tools and techniques discussed herein can include a hitch attachment system that includes a hitch attachment configured to be secured to a vehicle hitch and one or more implements configured to be attached to the vehicle hitch.

According to another aspect, a vehicle hitch implement may be a wire rack comprising a plurality of horizontally-extending spool axles, with the spool axles being vertically displaced from each other and horizontally displaced from each other.

According to yet another aspect, an implement can be slid into a mating configuration with a hitch attachment in a sliding motion. A securing mechanism can be configured to apply pressure transverse to a direction of the sliding motion to stabilize the implement relative to the hitch. The securing mechanism can comprise a housing that is not a unitary member with the hitch attachment or the implement (e.g., the housing may be a separate part that is welded, bolted, etc. to the hitch attachment and/or to the implement), and a threaded member passing through the housing to press the implement against the hitch attachment.

According to yet another aspect, a hitch attachment can include a body that is configured to slide into a horizontally-extending hollow tubing of a hitch, with the hitch attachment comprising a stabilizing system. The stabilizing system can include a mechanism that is configured to move a pressure member in a direction that is transverse to the horizontally extending body (such as in a direction that is perpendicular to the body or at some other non-zero angle relative to the horizontally extending body) so that the pressure member presses against an inwardly-facing surface of the hollow tubing.

According to another aspect, a body of a hitch attachment is slid into a horizontally-extending hollow tubing of a vehicle hitch. Also, the hitch attachment can be stabilized relative to the vehicle hitch using a stabilizing system. For example, this stabilizing can include rotating a threaded member of the stabilizing system so that the threaded member moves a pressure member of the stabilizing system in a transverse direction relative to a longitudinal axis of the hollow tubing of the hitch and presses the pressure member against an inwardly-facing surface of the hollow tubing of the hitch.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

FIG. 10 is an exploded perspective view of the hitch attachment of the hitch attachment system illustrated in the figures.

FIG. 11 is a perspective view of a housing for a stabilizing feature of the hitch attachment system illustrated in the figures.

FIG. 12 is a sectional view taken along line 12-12 in FIG. 1.

FIG. 13 is a perspective view of the central support of the wire rack in the hitch attachment system of FIG. 2.

FIG. 14 is a perspective view of a large diameter spool axle from the hitch attachment system of FIG. 2.

FIG. 15 is a perspective view of a small diameter spool axle that can be used with the hitch attachment system of FIG. 2 in place of one or more of the large diameter axles illustrated in other figures.

FIG. 16 is a perspective view of a spool stop for use with the large diameter spool axle illustrated in FIG. 14.

FIG. 17 is a perspective view of a spool stop for use with the small diameter spool axle illustrated in FIG. 15. The spool stop of FIG. 17 has the same features as the spool stop of FIG. 16, but is sized to fit the small diameter spool axle of FIG. 15.

FIG. 20 is a left side view of the hitch attachment system of FIG. 19.

FIG. 21 is a right side view of the hitch attachment system of FIG. 19.

DETAILED DESCRIPTION

Figure 1:
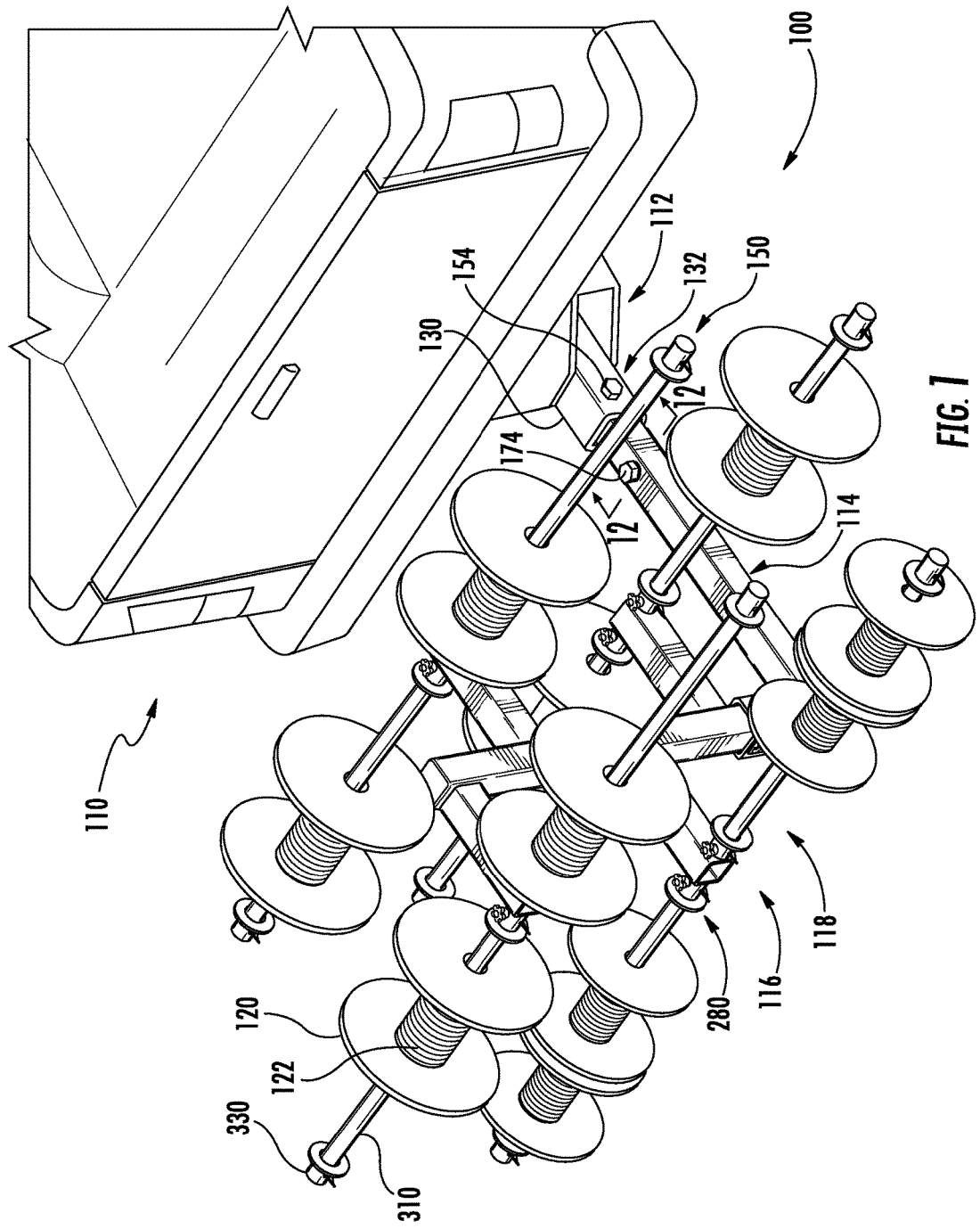
FIG. 1 is a perspective view of a hitch attachment system including a vehicle with a hitch to which the hitch attachment is secured.
Figure 2:
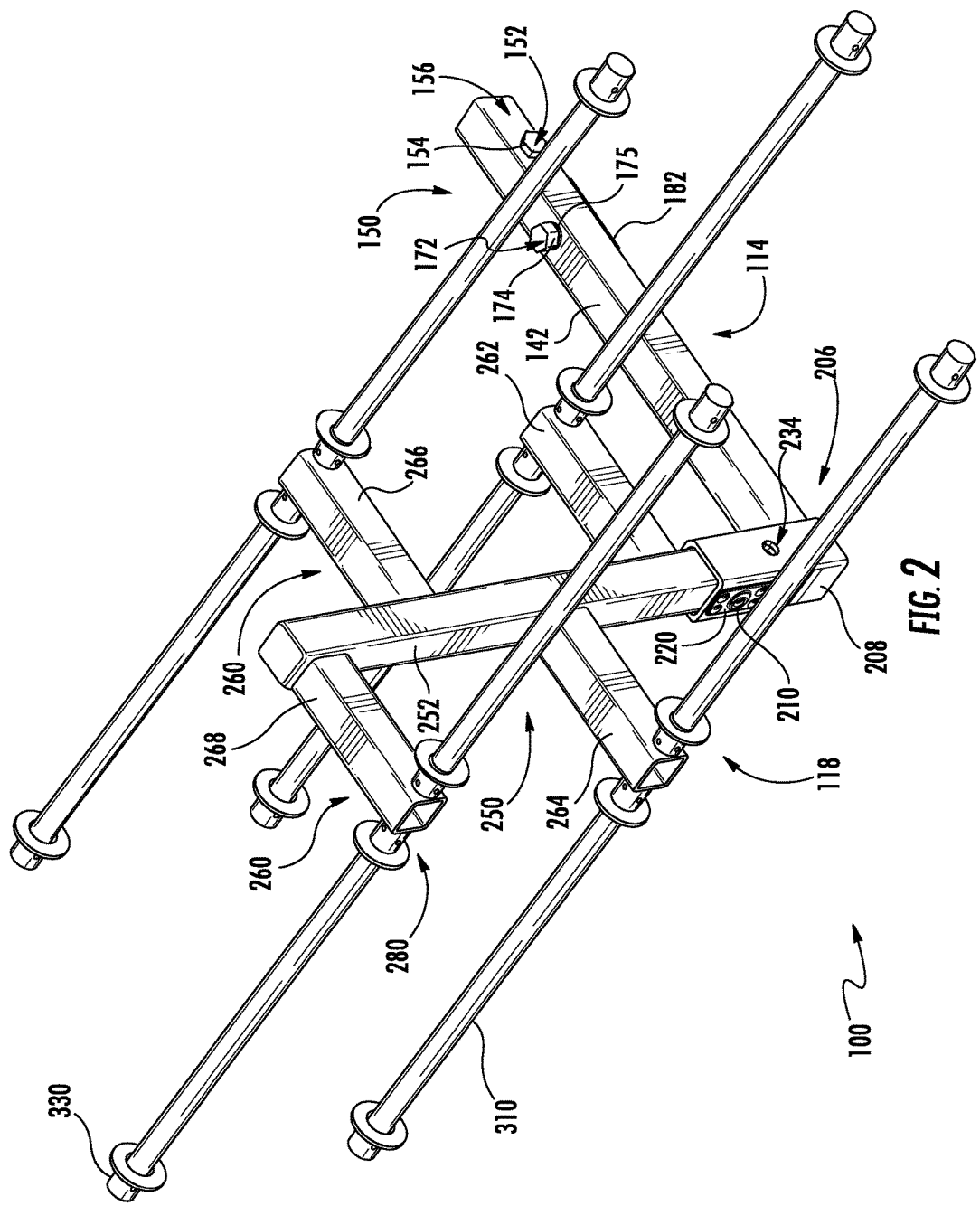
FIG. 2 is a perspective view of the hitch attachment system of FIG. 1 without spools on the wire rack, and without the system including the vehicle and hitch of FIG. 1.
Figure 3:
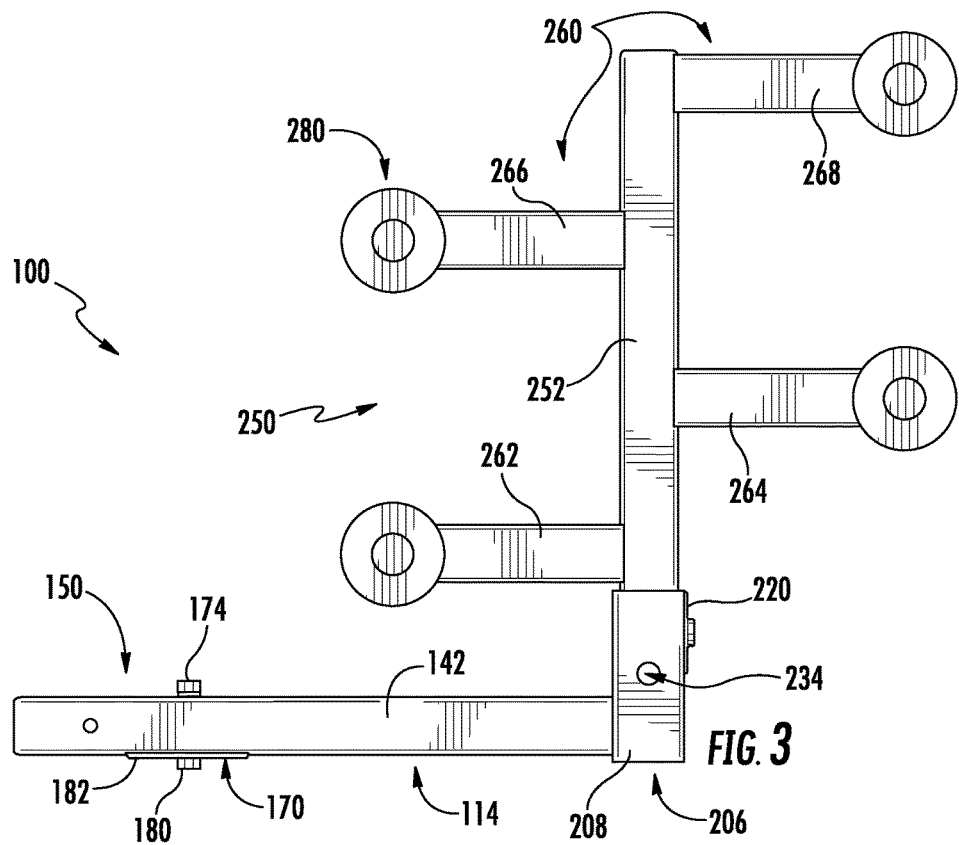
FIG. 3 is a left side view of the hitch attachment system of FIG. 2.
Figure 4:
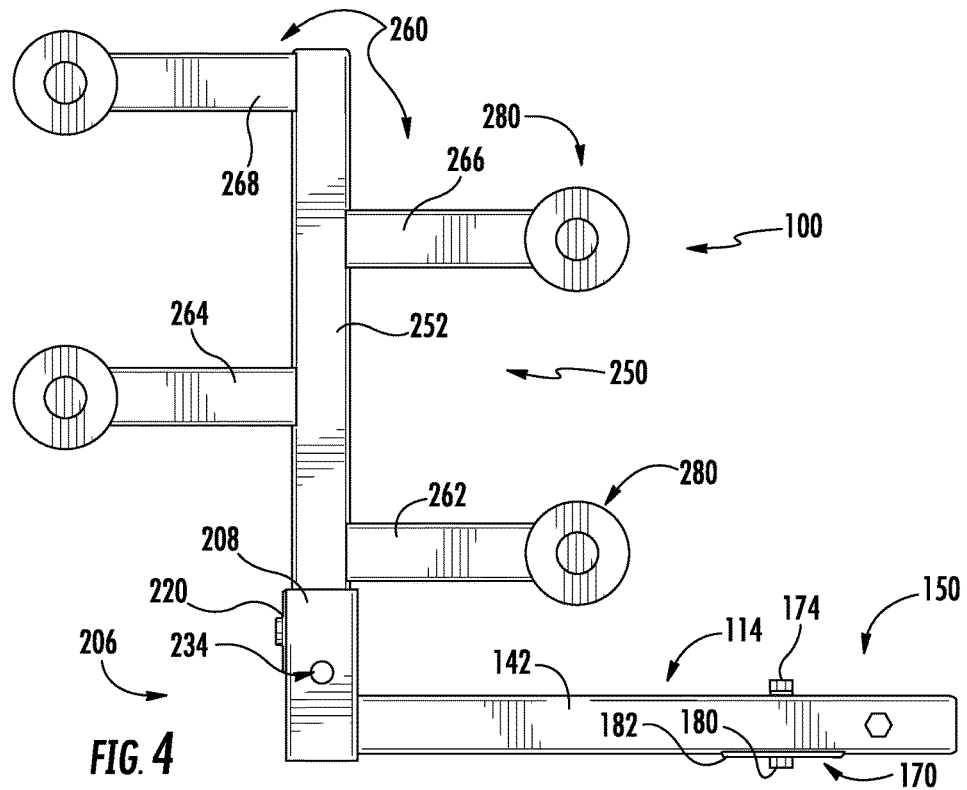
FIG. 4 is a right side view of the hitch attachment system of FIG. 2.
Figure 5:
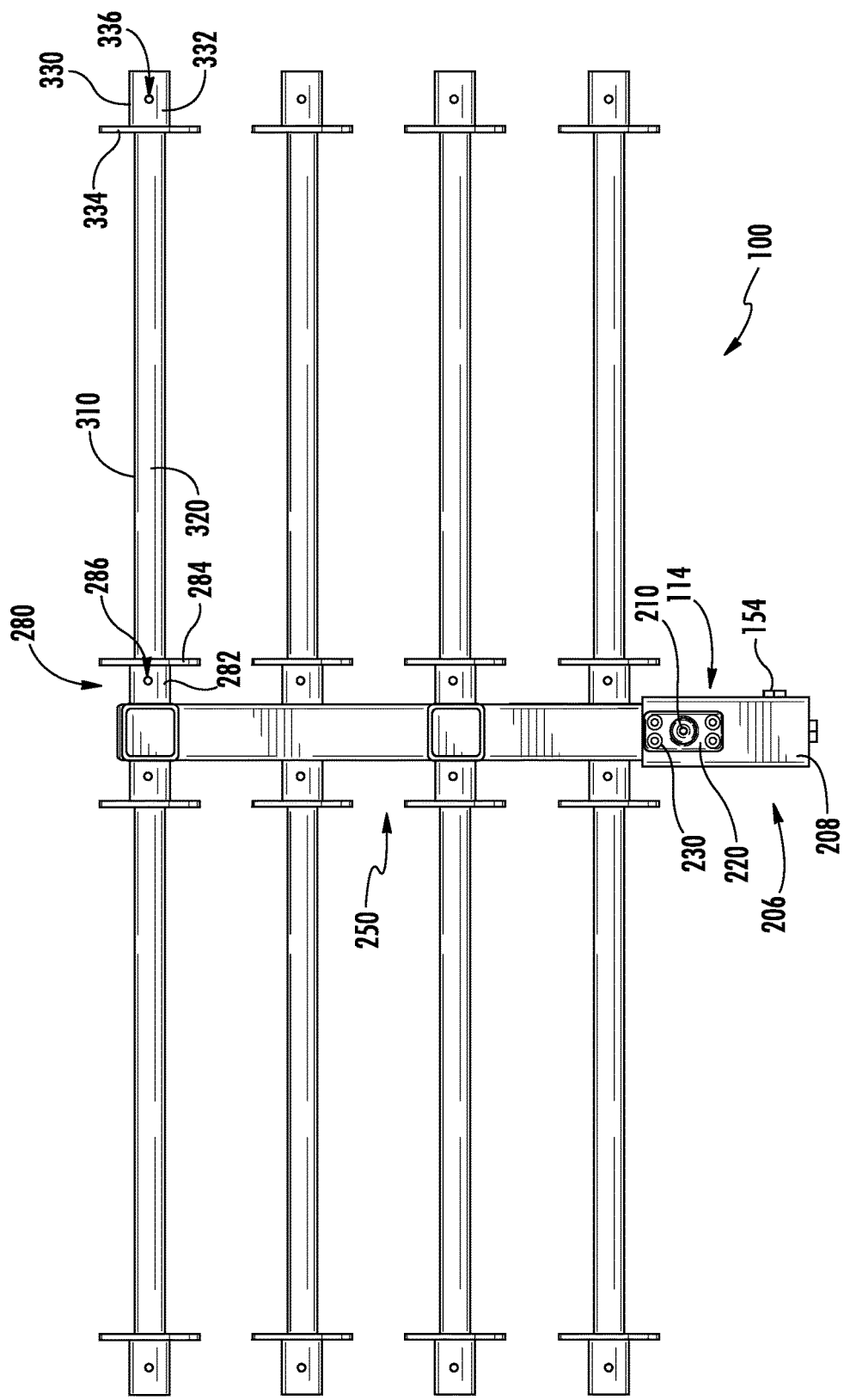
FIG. 5 is a rear view of the hitch attachment system of FIG. 2.
Figure 6:
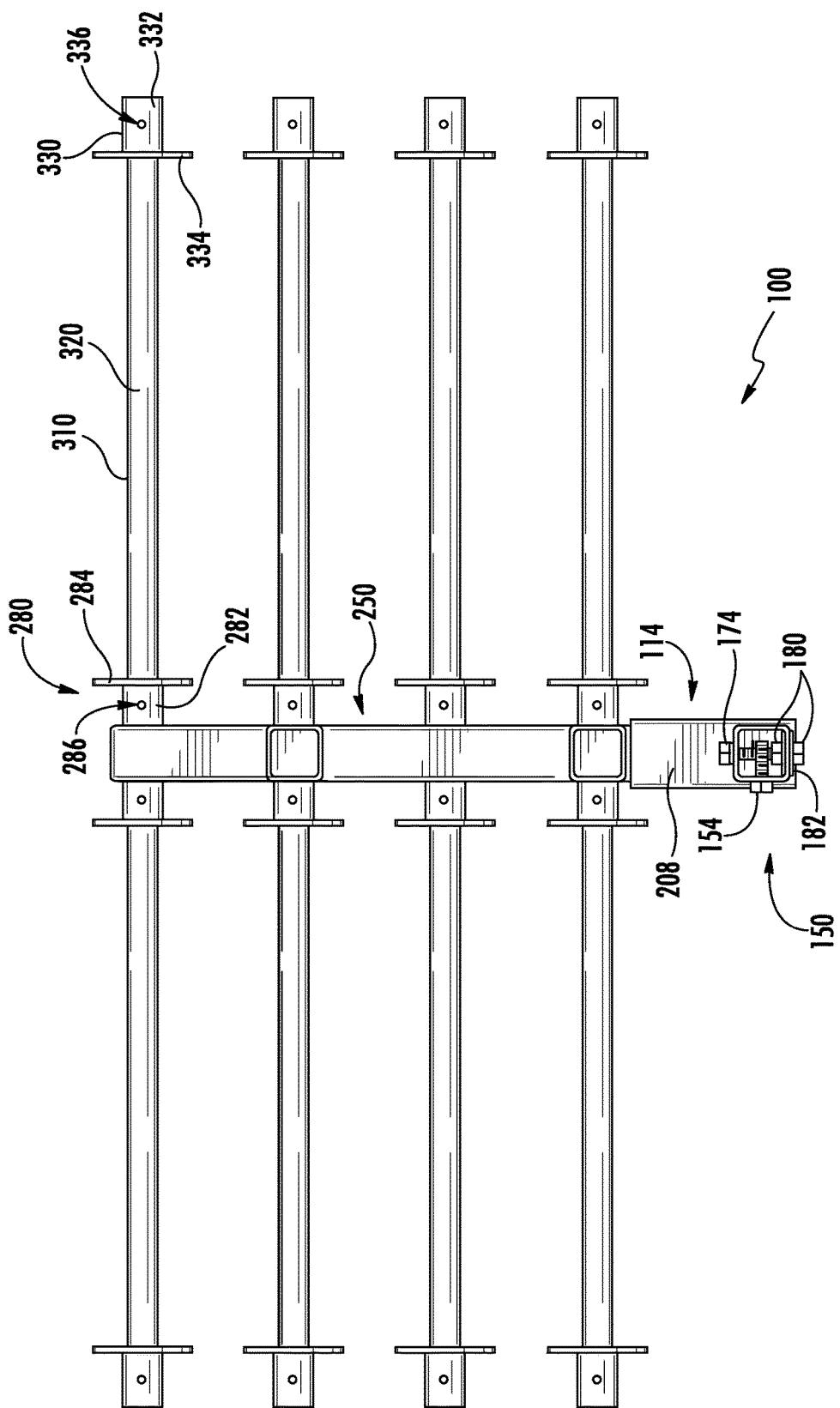
FIG. 6 is a front view of the hitch attachment system of FIG. 2.
Figure 7:
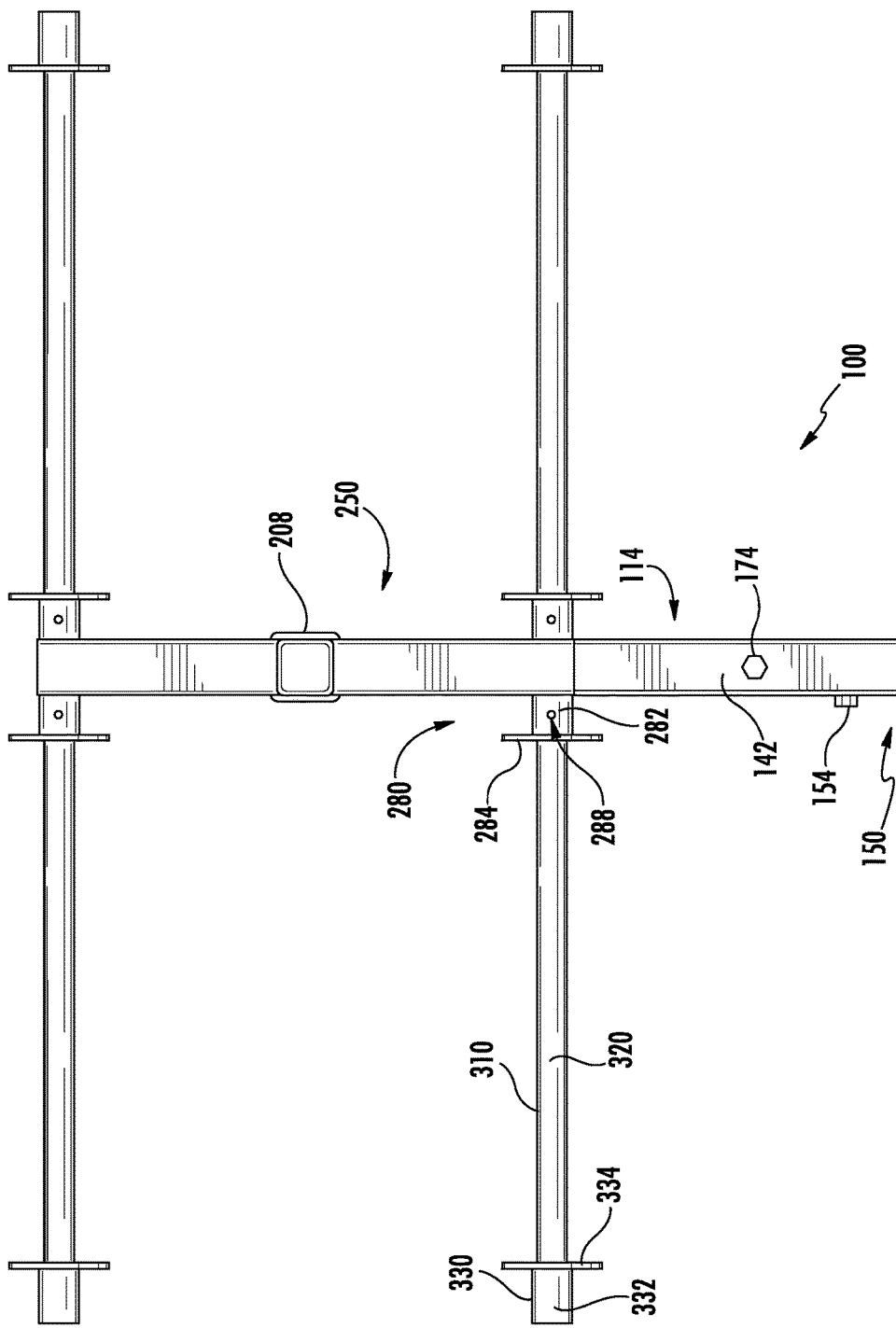
FIG. 7 is a top view of the hitch attachment system of FIG. 2.
Figure 8:
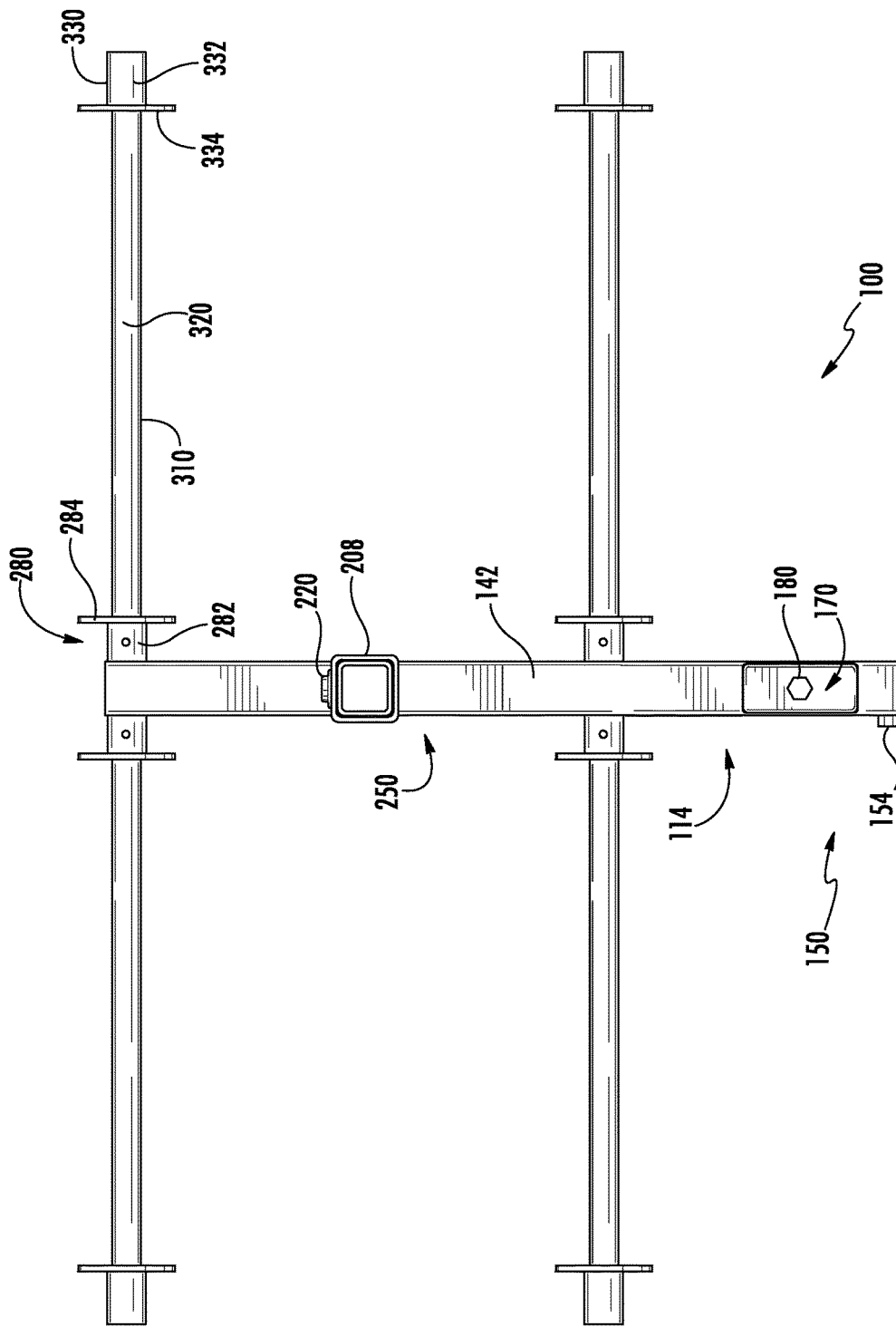
FIG. 8 is a bottom view of the hitch attachment system of FIG. 2.
Figure 9:
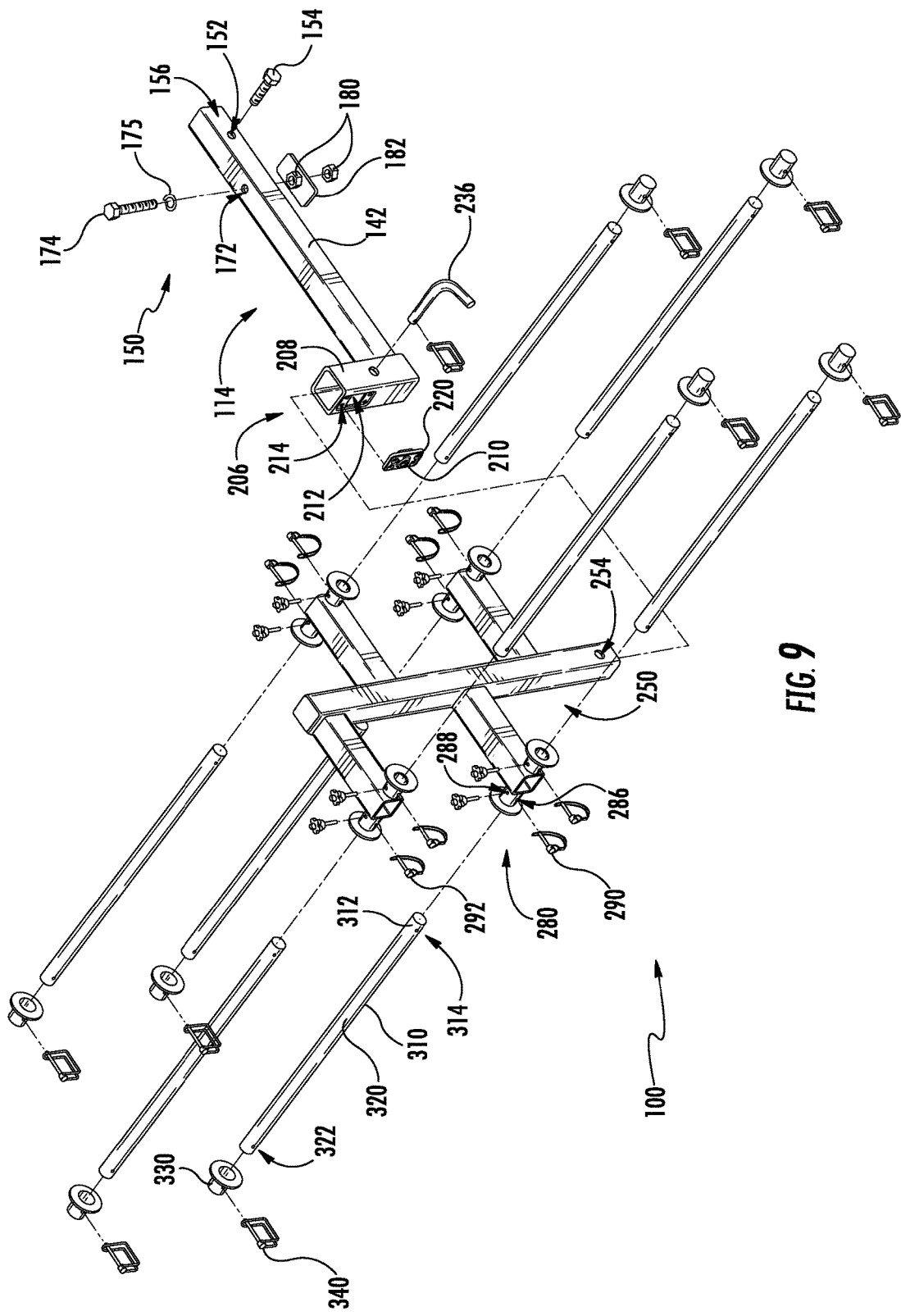
FIG. 9 is an exploded perspective view of the attachment system of FIG. 2, also showing various pins and other fasteners that are not illustrated in FIGS. 1-9.
Figure 18:
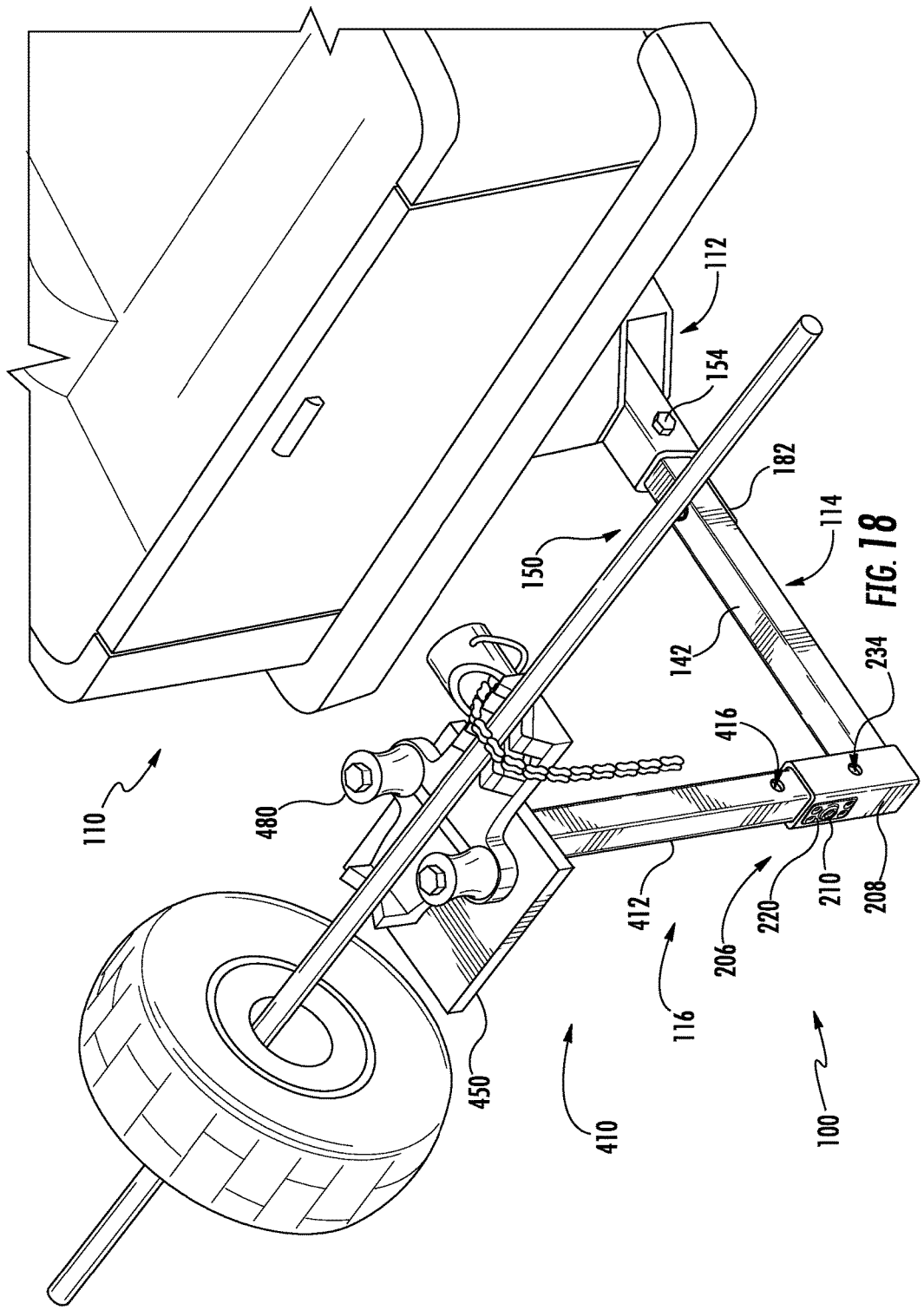
FIG. 18 is a perspective view of the hitch attachment system of FIG. 2, but with a vise stand instead of a wire rack being secured in the hitch attachment of the system.
Figure 19:
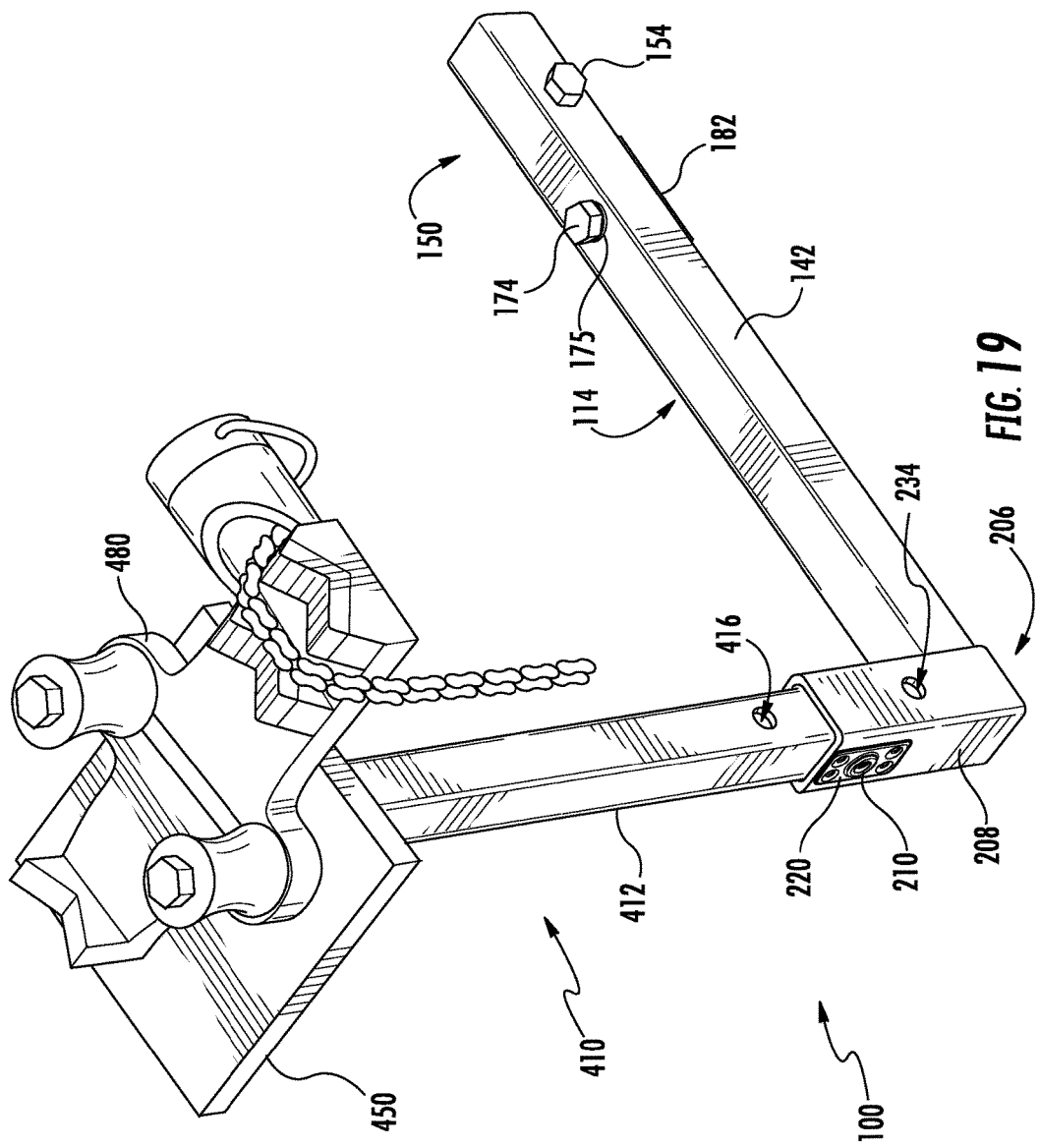
FIG. 19 is a perspective view of the hitch attachment system of FIG. 18, but without the vehicle and hitch, and without illustrating a working part secured in the vise.
Figure 23:
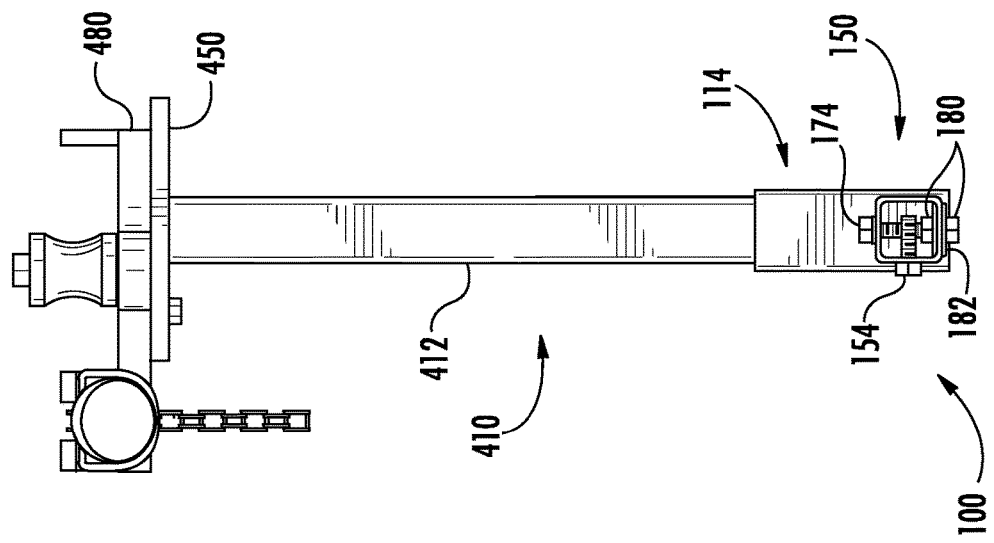
FIG. 23 is a front view of the hitch attachment system of FIG. 19.
Figure 22:
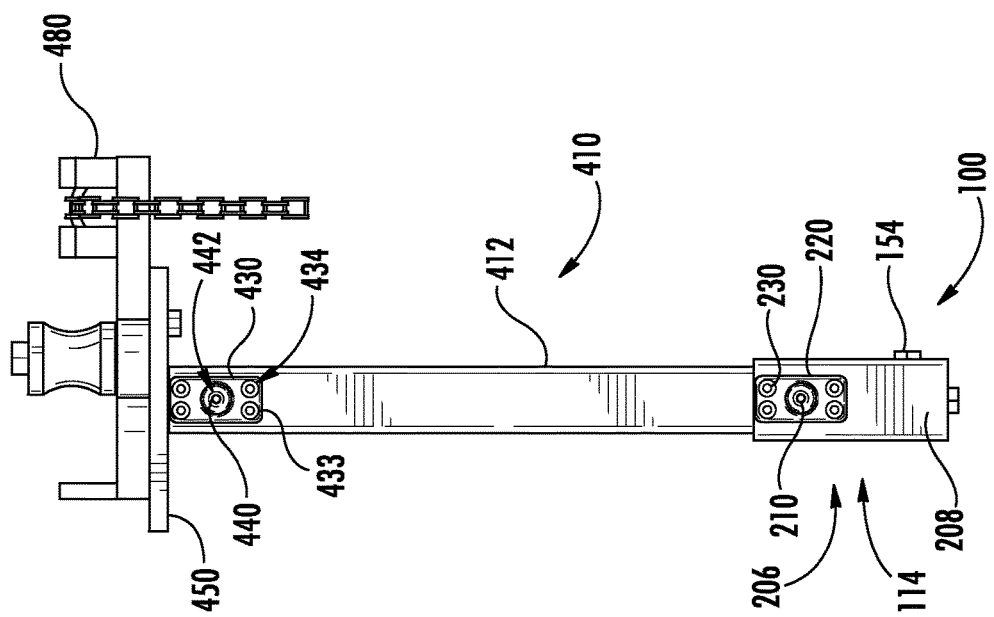
FIG. 22 is a rear view of the hitch attachment system of FIG. 19.
Figure 25:
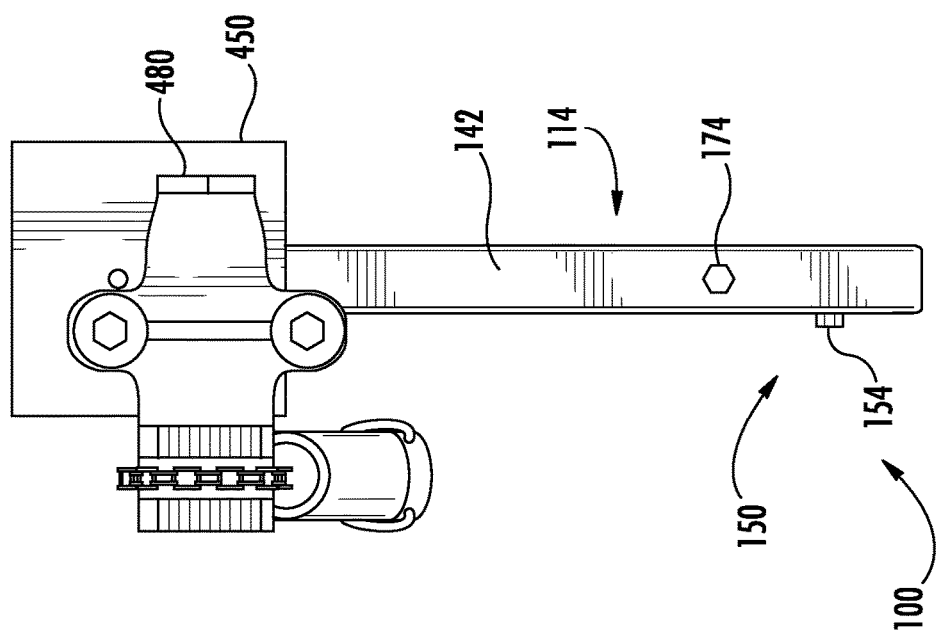
FIG. 25 is a top view of the hitch attachment system of FIG. 19.
Figure 24:
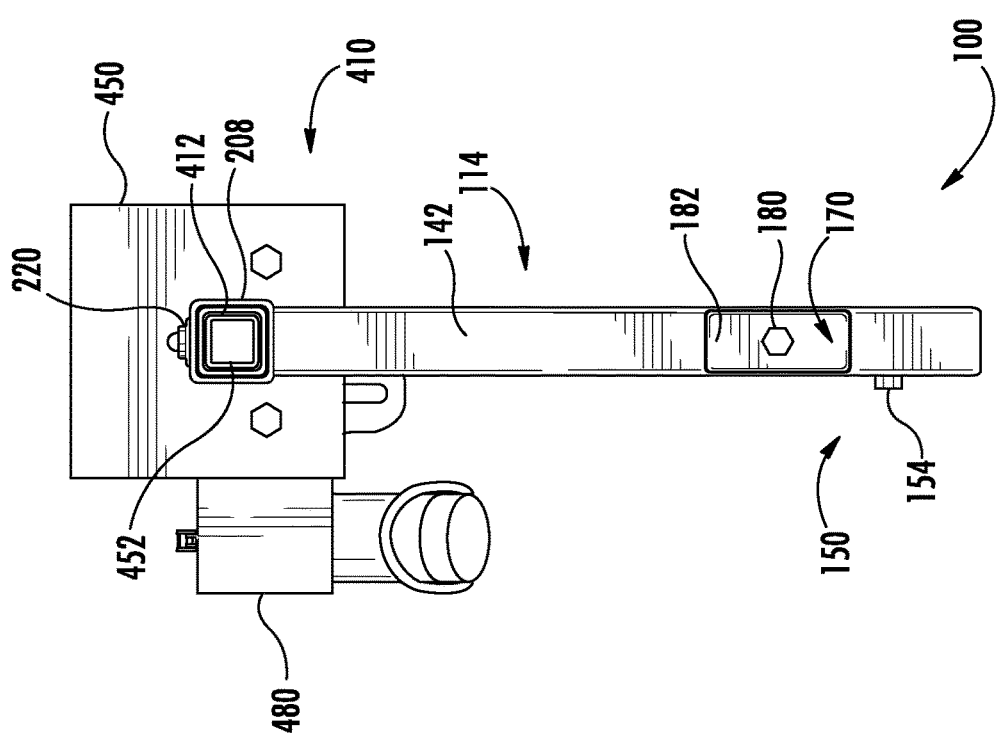
FIG. 24 is a bottom view of the hitch attachment system of FIG. 19.
Figure 26:
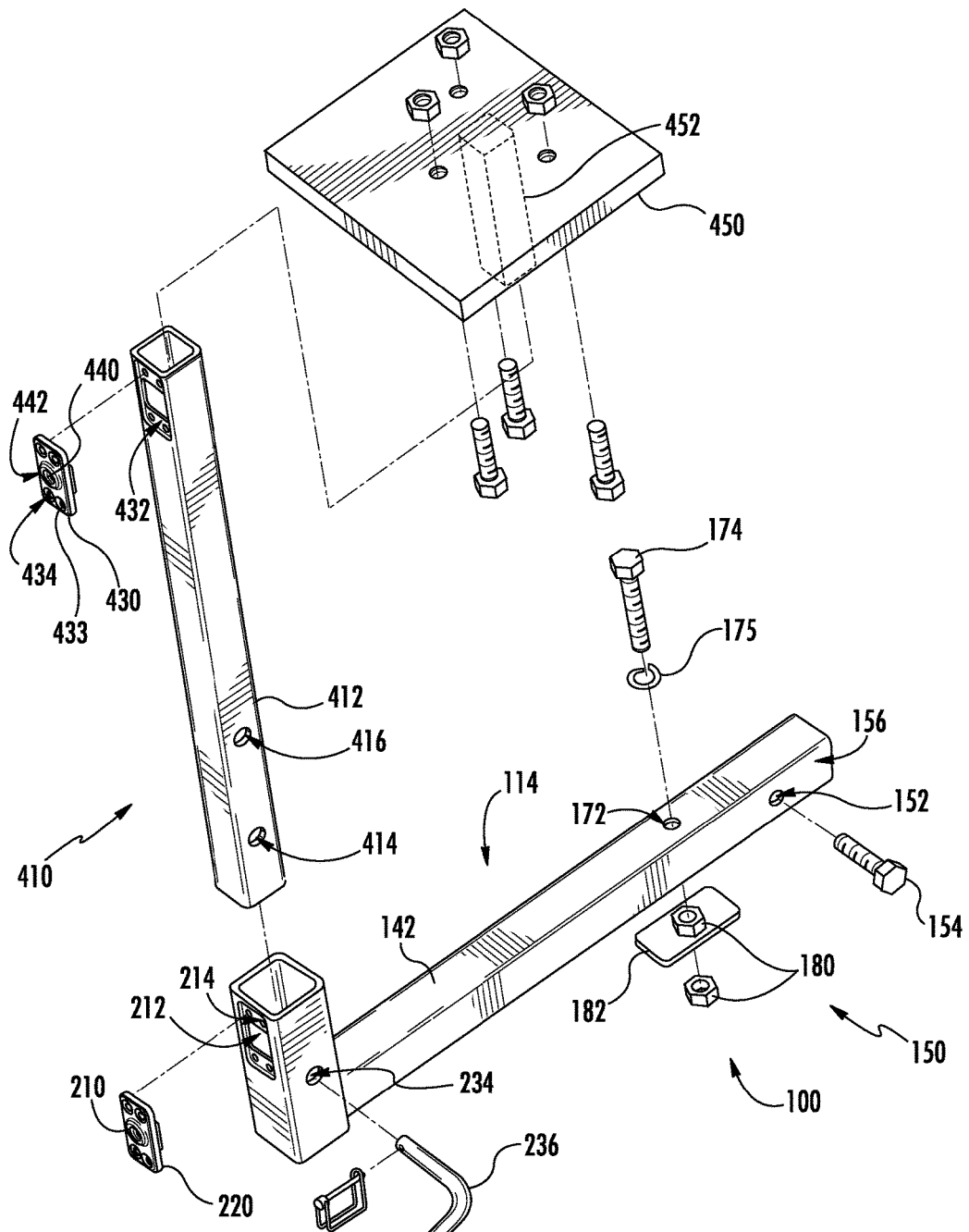
FIG. 26 is an exploded perspective view of the hitch attachment system of FIG. 19.
Figure 27:
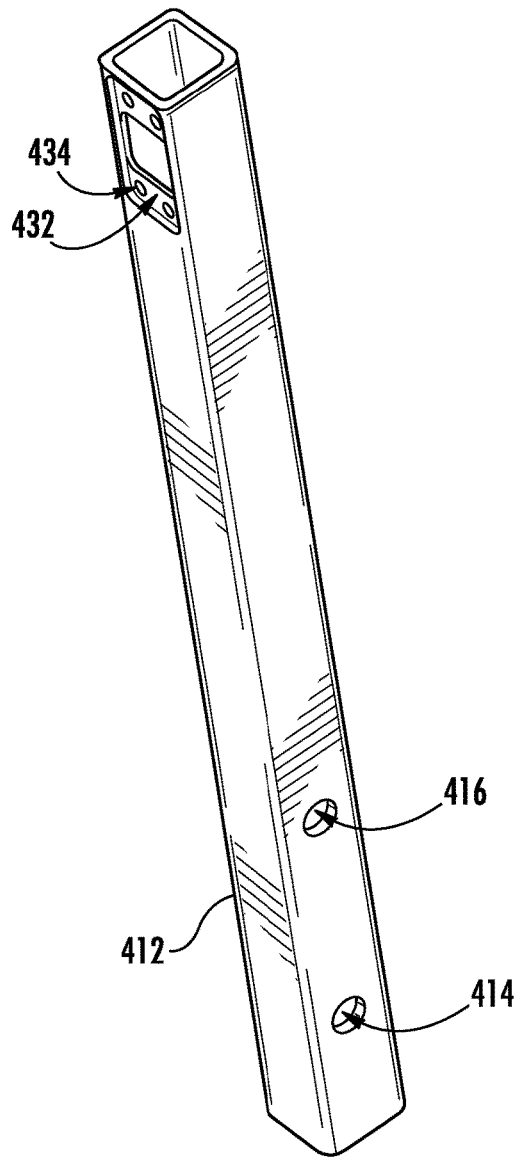
FIG. 27 is a perspective view of the vertically extending bar of the vise stand in the hitch attachment system of FIG. 19.
Figure 28:
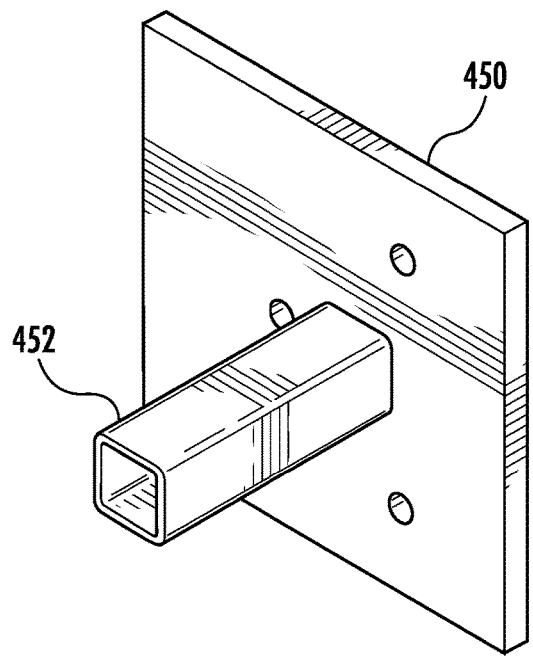
FIG. 28 is a perspective view of the mounting plate and stem of the vise stand of FIG. 19.

Referring to FIG. 1, a hitch attachment system 100 will be discussed. The hitch attachment system 100 can include a vehicle 110 having a rear-facing hitch 112. The hitch attachment system 100 can further include a hitch attachment 114 that is secured to the hitch 112 and that extends rearward from the hitch 112. An implement 116 can extend up from the hitch attachment 114. Specifically, in the configuration illustrated in FIG. 1, the implement 116 is a wire rack 118. The wire rack 118 is secured to the hitch attachment 114, and has a plurality of spools 120. The spools 120 can include a material 122 wound thereon, such as wire or some other product. Accordingly, while the wire rack 118 is termed a "wire" rack herein for convenience, the spools 120 may be spools of twine, string, rope, wire, tubing, or some other product wound onto a spool 120. Accordingly, the hitch attachment system 100 can enable a useful implement 116 such as the wire rack 118 to be supported by a vehicle hitch 112.

The hitch attachment system 100 can allow different implements 116 to be switched on the hitch attachment 11, so that the hitch attachment 114 can be used to support any of a variety of implements 116. For example, such interchangeable implements may include any combination of various different types of implements, such as a wire rack 118, a platform luggage rack, a vise stand (discussed below), a goal post-shaped vehicle bed extender, a bike rack, and/or some other implement. Additionally, the hitch attachment system 100 can be configured to stabilize the attachment to the hitch 112 and the attachment to an implement 116, so that the implement 116 can be stabilized relative to the vehicle 110.

A. Structure of the Hitch Attachment System

Referring still to FIG. 1, the structure of the hitch attachment system 100 will be discussed in more detail, including two different example implements. The hitch 112 can include a tubular member 130, which can extend axially rearward from the vehicle 110. For example, the tubular member 130 can be a tubular member with a generally rectangular cross section. The tubular member 130 can be any of various different shapes, thicknesses, materials, etc. so long as it defines a hole or aperture into which the hitch attachment 114 can extend and is sufficiently strong, rigid and durable. For example, the tubular member can be a hollow rectangular steel tube. The tubular member 130 can define a pin hole 132 therein that extends transversely (i.e., extending in a different direction from the main longitudinal direction or axis of the tubular member 130) through the tubular member 130, such as extending horizontally perpendicular to the longitudinal direction of the tubular member 130 and through both side walls of the tubular member 130.

Referring now to FIGS. 1-17, the hitch attachment 114 and the wire rack 118 will be discussed in more detail. The hitch attachment 114 can include a body 142, a portion of which fits into the tubular member 130 of the hitch 112. For example, the body 142 can be a tubular member with a generally rectangular shaped cross section, which is smaller than the cross section of the tubular member 130 of the hitch 112, so that a portion of the body 142 fits within the hitch 112.

The hitch attachment 114 can include a stabilizing system 150, which can be utilized to stabilize the hitch attachment 114 relative to the hitch 112. As part of the stabilizing system 150, the body 142 of the hitch attachment 114 can define a threaded hole 152 in a side wall of the body 142. The threaded hole 152 of the body 142 can be configured to align with the pin hole 132 of the hitch 112 while the hitch attachment 114 is inserted into the tubular member 130 of the hitch 112 in an operable configuration, as illustrated in FIG. 1. The threaded hole 152 can receive a threaded fastener 154, such as a standard bolt that can also pass through the pin hole 132 in the tubular member 130 the hitch 112. The threaded fastener 154 can be rotated to tighten the threaded fastener 154, thereby pulling the body 142 of the hitch attachment 114 toward a side wall of the tubular member 130 of the hitch 112. When the threaded fastener 154 is fully tightened, the threaded fastener 154 can press the side wall of the tubular member 130 of the hitch 112 between a head of the fastener and a side wall of the body 142 of the hitch attachment 114. In this configuration, an outer surface 156 of the body 142 of the hitch attachment can be pressed against an inner surface 158 of the tubular member 130 of the hitch 112 (see FIG. 12). This pressing can assist in stabilizing the hitch attachment 114 relative to the hitch 112 by inhibiting horizontal (side-to-side) rotational and/or translational movement of the hitch attachment 114.

The stabilizing system 150 can further include features to inhibit vertical (up-and-down) rotational and/or translational movement of the hitch attachment 114. Specifically, the body 142 of the hitch attachment 114 can define an aperture 170, such as a cutout in a bottom wall of the body 142 (see, e.g., FIGS. 8 and 12). The aperture 170 can be at least partially within the tubular member 130 of the hitch 112 while the hitch attachment system 100 is in the operational position illustrated in FIG. 1. Additionally, a top wall of the body 142 of the hitch attachment can include a female threaded hole 172, through which a threaded fastener 174 such as a bolt can extend, as illustrated in FIG. 12. A washer 175 can be positioned on the threaded fastener 174 adjacent to the fastener's head. Additionally, the hitch attachment 114 can include flanges 180 extending out from the threaded fastener 174 below the threaded hole 172 and within the aperture 170. For example, the flanges 180 can each be a nut that is fixed to the threaded fastener 174, such as where one or both of the flanges 180 is a lock nut and/or where one or both of the flanges 180 is welded to the threaded fastener 174.

A pressure member 182 can be sandwiched between the flanges 180 so that vertical movement of the threaded fastener 174 forces the pressure member 182 to move with the threaded fastener 174. Accordingly, as the threaded fastener 174 is turned into and out of the threaded hole 172 in the body 142 of the hitch attachment 114, the pressure member 182 moves respectively away from and toward the threaded hole 172. Accordingly, the threaded fastener 174 can be turned in a first direction to draw the pressure member 182 into the aperture 170 in the body 142 of the hitch attachment 114 and can be turned in a second direction that is opposite to the first direction to push the pressure member 182 away from the body 142 of the hitch attachment 114 and at least partially out of the aperture 170. The first and second directions of travel of the fastener 174 (also the axis of rotation of the fastener) can be perpendicular to a longitudinal axis of the body 142 (also the direction in which the body 142 slides into and out of the hitch 112), and/or can move the pressure member 182 in a direction that is perpendicular to the longitudinal axis of the body 142. The first and second directions of travel of the fastener 174 and/or the direction of movement of the pressure member 182 may be selected to be other directions transverse to the longitudinal axis of the 4 body 142, such as another direction that within 5 degrees of being perpendicular to the longitudinal axis of the body 142, or within 10 degrees of being perpendicular to the longitudinal axis of the body 142, or within 20 degrees of being perpendicular to the longitudinal axis of the body 142, or within 30 degrees of being perpendicular to the longitudinal axis of the body 142, or within 45 degrees of being perpendicular to the longitudinal axis of the body 142, or within 60 degrees of being perpendicular to the longitudinal axis of the body 142, or within 70 degrees of being perpendicular to the longitudinal axis of the body 142, or within 80 degrees of being perpendicular to the longitudinal axis of the body 142, or within 85 degrees of being perpendicular to the longitudinal axis of the body 142. With the hitch attachment system 100 in the operational configuration of FIG. 1, the pressure member 182 can be pushed at least partially out of the aperture 170 so that the pressure member 182 presses against an inner surface 190 of the tubular member 130 of the hitch 112. That inner surface 190 of the tubular member 130 of the hitch 112 can be perpendicular to the inner surface 158 against which the outer surface 156 of the body 142 of the hitch attachment is pressed by the threaded fastener 154. For example, the inner surface 190 can be an inner surface of a bottom wall of the tubular member 130 of the hitch 112, and the inner surface 158 can be an inner surface of a side wall of the tubular member 130 of the hitch 112. Accordingly, in the operational configuration of FIG. 1 with the stabilizing system 150 engaged, the stabilizing system 150 can inhibit both vertical and horizontal movement of the hitch attachment 114 relative to the hitch 112.

At an end of the body 142 that is distal from the hitch 112, the hitch attachment 114 can include an implement-attaching feature 206. In the illustrated example, the implement attaching feature 206 can include a vertically-extending sleeve 208, which can be configured to receive a portion of an implement 116. For example, the vertically extending sleeve 208 can be a tubular member, such as a tubular member with a rectangular cross section. The vertically extending sleeve 208 can be secured to the body 142 of the hitch attachment 114 in any of various ways, such as welding, securing with fasteners, etc.

The vertically extending sleeve 208 can receive a threaded fastener 210 extending transverse to the longitudinal direction of the sleeve 208. The threaded fastener 210 can be rotated to press the implement 116 against the vertically extending sleeve 208. In one example illustrated in the figures, as can be seen in FIG. 10, the sleeve 208 can define a main hole 212, which can be surrounded by a recessed area 214. A plurality of threaded holes 216 (such as four threaded holes 216, as shown in FIG. 11) can pass through a wall of the vertically extending sleeve 208 in the recessed area 214. The implement-attaching feature 206 can further include a housing 220 that is shaped to fit into the recessed area 214 of the vertically extending sleeve 208. The housing 220 can include peripheral holes 222 that align with the threaded holes 216 of the vertically extending sleeve 208 when the housing 220 is seated in the recessed area 214. Threaded fasteners 230 can extend through the peripheral holes 222 of the housing 220 and into the threaded holes 216 of the vertically extending sleeve 208 with the housing 220 seated in the recessed area 214 to secure the housing to the vertically extending sleeve 208. The threaded fastener 210, such as an Allen screw, can be threaded through a threaded hole 232 in the housing 220, to extend into a central area of the vertically extending sleeve 208. The housing 220 can be thicker than the walls of the sleeve 208 so that the threaded fastener 210 can function without extending beyond the housing 220, so that the threads of the threaded fastener 210 can be protected. The threaded hole 232 can be countersunk or otherwise recessed to allow threads of the threaded fastener 210 to be protected by the housing 220 and still allow sufficient operational room for the threaded fastener 210. Accordingly, with a portion of an implement 116 positioned within the vertically extending sleeve 208, the threaded fastener 210 can press the implement 116 against an opposite wall of the vertically extending sleeve 208 to secure the implement 116 to the hitch attachment 114 and stabilize the implement 116 relative to the hitch attachment 114. Additionally, the vertically extending sleeve 208 may define a pin hole 234 through the sleeve 208. A pin 236 (see FIG. 9) can extend through the pin hole 234 in the sleeve 208 and through a matching hole in the implement 116 to further secure the implement 116 to the hitch attachment 114. Additionally, the pin 236 may be placed through the pin hole 234 in the sleeve 208 and through the implement 116 to hold the implement 116 in place relative to the hitch attachment 114 while the threaded fastener 210 is tightened to stabilize the implement 116 relative to the hitch attachment 114.

While not shown, the implement-attaching feature 206 could include an additional housing that is the same as the housing 220 with a stabilizing threaded fastener like threaded fastener 210 in a wall of the vertically extending sleeve 208 that is perpendicular to a wall of the vertically extending sleeve where the housing 220 is mounted. Such an additional housing and threaded fastener feature could help to further stabilize the implement 116 by inhibiting movement in an additional direction.

Referring still to FIGS. 1-17, the wire rack 118 (which is an example of an implement 116 that can be used with the hitch attachment 114) will be discussed in more detail. The wire rack 118 can include a central support 250, which can include a vertically-extending bar 252 extending up from the vertically extending sleeve 208 of the hitch attachment 114. For example, the vertically-extending bar 252 can be a tubular member whose cross sectional size and shape allow it to fit within the vertically extending sleeve 208 of the hitch attachment 114. The vertically extending bar 252 can define a pin hole 254 extending through the bar 252, which can be positioned to align with the pin hole 234 in the vertically extending sleeve. The pin hole 234 and the pin hole 254 can receive the pin 236, as discussed above. Additionally, the threaded fastener 230 of the hitch attachment 114 can press against a portion of the vertically extending bar 252 that extends into the vertically extending sleeve 208 to stabilize the central support 250 of the wire rack 118 relative to the hitch attachment 114, as discussed above.

The central support 250 can also include horizontally extending bars 260, which form a staggered alternating pattern of forward-extending and then rearward-extending bars extending from the vertically extending bar 252 as the central support 250 rises above the hitch attachment 114. For example, as illustrated in the Figures, in one example, the central support 250 can include a lowest forward extending bar 262, with a lowest rearward extending bar 264 being above the lowest forward extending bar 262. The central support can include another forward extending bar 266 immediately above the lowest rearward extending bar 264, and yet another rearward extending bar 268 immediately above the forward extending bar 266. Thus, the horizontally extending bars 260 can be in a staggered configuration of alternating forward extending bars 262 and 266 and rearward extending bars 264 and 268 going up the central support 250. Such a staggered configuration can form an ornamental appearance and can also allow for the more room for spools on axles from each of the bars, as opposed to a non-staggered linear configuration.

At the end of each horizontal bar 260, the central support 250 can include a pair of spool axle mounts 280, with one spool axle mount 280 on each side (left and right sides) of the horizontal bar 260. Each spool axle mount can include a tube 282 that extends to the side from the horizontal bar 260, and an annular flange 284 that extends radially out from an end of the tube 282 distal from the horizontal bar 260. Additionally, each spool axle mount 280 can define a pin hole 286 extending through the tube 282 of the mount 280. Also, each mount 280 can define a threaded hole 288 that extends through one wall of the tube 282 of the mount 280. A pin 290 can extend through each pin hole 286 and a threaded fastener 292 can extend through each threaded hole 288 to secure a spool axle 310 to the central support 250 of the wire rack 118 (see FIG. 9).

Accordingly, the wire rack 118 can include multiple spool axles 310, with a spool axle extending to a side from each axle mount 280. Each spool axle 310 can be a circular cross-sectioned rod including an insert section 312 that is sized to fit within the tube 282 of a corresponding mount 280. Each insert section 312 can include a pin hole 314 that aligns with the pin hole 286 so that a pin 290 can extend through the pin hole 286 in the mount and through the pin hole 314 in the corresponding insert section 312 of the spool axle 310. Each spool axle 310 can also include a support section 320 that extends away from the insert section 312 in a sideways direction (i.e., to the right or left as oriented relative to the vehicle 110). Near an end of the support section 320 distal from the insert section 312, the support section 320 can define a pin hole 322 extending transversely through the support section 320.

A spool stop 330 can be attached to an end of each support section 320 distal from the insert section 312. Each spool stop 330 (illustrated alone in FIGS. 16-17) can include a tube 332 and a flange 334 at an end of the tube 332. The flange 334 can face inwardly toward the central support 250 of the wire rack 118. The tube 332 of each spool stop 330 can define a pin hole 336 extending transversely through the tube 332. The pin hole 336 of the spool stop 330 can align with the pin hole 322 of the corresponding support section 320 of a spool axle 310, and can receive a spool stop pin 340 to secure the spool stop 330 to the support section 320 of the spool axle 310 (see FIG. 9).

The spool axles 310 can come with different diameters in their support sections 320. For example, a smaller diameter spool axle 350 may be used to allow for spools with smaller diameter central holes, while larger diameter spool axles 360 may be used for spools that are heavier, but have larger diameter central holes. Also, spool axles 310 with different diameters in the support sections 320 can have corresponding spool stops 330 with matching tubes 332 that allow for an optimal fit with the corresponding spool axle support section 320 to fit within the corresponding tube 332. As can be seen, smaller diameter support sections 320 may be used with insert sections 312 that are larger than the diameters of the support sections 320 (compare FIGS. 14 and 15).

The wire rack could have any of various other configurations and still accomplish the functions and produce the benefits discussed herein. For example, the main bar of the central support could extend in a upwardly-sloping direction rather than a vertical direction, and bars extending out from the main bar could extending in sloping directions rather than horizontally. Additionally, other support structures besides the bars discussed above could be used.

In addition to its function, the design illustrated in FIGS. 1-17 for the wire rack 118 is particularly ornamental. It is noted that such an ornamental design could take various forms, and could include all or only portions of the features illustrated in FIGS. 1-17. For example, the design could exclude the vehicle and the vehicle hitch, as well as other features of the wire rack and/or hitch attachment. For example, the design may omit one or more of the features of the stabilizing system discussed above, and/or fasteners (threaded fasteners, pins, etc.) and/or holes, apertures, and/or housings that are positioned and shaped for purposes of securing the various components together and stabilizing them relative to each other in a stable manner. Additionally, the wire rack 118 may be considered a separate design from the hitch attachment 114, and the combination thereof may be considered yet another design. Similarly, the vise stand discussed below can be considered a separate design from the hitch attachment, and separate from the vise shown in the figures. Additionally, the combination of the vise stand and the hitch attachment can be considered yet another ornamental design. As with the wire rack designs, the vise stand designs may also include or exclude one or more of the various combinations of different types of features discussed above (fasteners, holes, apertures, stabilizing features, etc.).

Referring now to FIGS. 18-28, the hitch attachment system 100 the hitch attachment 114 discussed above can be secured to a vise stand 410. The vise stand 410 can include a vertically extending bar 412, which can define a pair of pin holes 414 and 416 at different heights on the bar to allow for vertical adjustment of the vise stand 410 (see FIG. 26). One of the pin holes 414 or 416 can be aligned with the pin hole 234 in the sleeve 208, and with the pin 236 extending through the pin hole 414 or 416 in the vertically extending bar 412 and through the pin hole 234 in the sleeve 208.

Near a top end of the vertically extending bar 412, the vise stand 410 can include a housing 430 that can be the same as the housing 220 discussed above. The housing 430 can be seated in and secured to the vertically extending bar 412 in the same manner as the housing 220 is seated in and secured to the vertically extending sleeve 208, with the housing 430 including the same features as the housing 220, and the vertically extending bar 412 including a recess 432 and peripheral holes 434 that are the same as the recessed area 214 and peripheral holes 222 in the vertically extending sleeve 208 discussed above. The vise stand 410 can further include threaded fasteners 433 securing the housing to the vertically extending bar 412, and can further include a threaded fastener 440 that can be threaded through a threaded hole 442 in the housing 430 to extend into a central area of the vertically extending bar 412.

The vise stand 410 can further include a horizontally extending mounting plate 450 and a stem 452 descending from a central portion of the mounting plate 450. The stem 452 can extend downwardly into a top portion of the vertically extending bar 412. Accordingly, with at least a portion of the stem 452 extending into the vertically extending bar 412, the threaded fastener 440 can press the stem 452 against an opposite wall of the vertically extending bar 412 to secure and stabilize the stem 452 relative to the vertically extending bar 412. Thus, the vise stand 410 can secure and stabilize the vise mounting plate 450 relative to the hitch attachment 114. Additionally, a vise 480, such as the chain vise shown in the illustrations, can be secured to the vise mounting plate 450 in a standard manner. The hitch attachment system 100 can thereby secure and stabilize the vise 480 relative to the hitch 112 of the vehicle 110. This can allow the vise 480 to be used for one or more of various vise operations, such as securing a mechanical part while work is performed on the part.

B. Materials and Manufacturing/Assembly of the Hitch Attachment System

The structural components of the hitch attachment system 100 can be made of a material that is rigid and durable, and that can withstand high levels of torque and pressure, such as the torque and pressure applied when securing and stabilizing the various threaded fasteners in the hitch attachment system and when using one or more of the implements. For example, the components can be light gauge steel. The pins and threaded fasteners can be standard threaded fasteners, such as pins, Allen screws, bolts, nuts, etc.

The manufacture of the hitch attachment system can use stock materials such as rectangular steel tubing, steel rods, etc. Some components (such as the body 142 and the vertically extending sleeve 208 of the hitch attachment 114; the bar 252, bars 260 and spool axle mounts 280 of the wire rack 118; and the mounting plate 450 and stem 452 of the vise stand 410) can be secured together by welding. Additionally, the various holes can be drilled, and the threaded holes can be tapped with threads. The housing 220 can be screwed in place relative to the vertically extending sleeve 208, and the housing 430 can be screwed in place relative to the vertically extending bar 252. Manufacture of some components, such as the housing 220 and housing 430 may involve the use of dyes and/or milling. Other milling or other cutting processes (laser cutting, torch cutting, grinding, and/or some other cutting process) may be used to form the recess 432, the recessed area 214, and the aperture 170.

Additionally, manufacturing can involve assembling the components of the stabilizing system 150. This assembling process can include placing the washer 175 on the threaded fastener 174 and threading the fastener 174 into the female threaded hole 172 as illustrated in FIG. 12. A first flange 180 can be placed on the threaded fastener. For example, if the first flange is a nut, the first flange 180 can be screwed onto the bolt and welded in place or secured in some other manner (e.g., using an adhesive, etc.). The pressure member 182 can then be positioned on the threaded fastener 174 adjacent to the first flange 180, and the second flange 180 can be positioned adjacent to the pressure member 182 so that the pressure member 182 is sandwiched between the flanges 180. The second flange 180 can be secured to the threaded fastener 174, such as by the second flange 180 being a lock nut or by welding the second flange to the threaded fastener 174. The flanges 180 can be positioned so that the threaded fastener 174 can be rotated through the female threaded hole 172 to move the pressure member so that the pressure member 182 can slide partially into the hitch 112 in one position but can apply pressure to the inside wall of the hitch 112 in another position. As discussed, the threaded fastener 174 can be rotated to move the pressure member 182 between these positions.

C. Use of the Hitch Attachment System

In using the hitch attachment system 100, an implement 116 can be chosen. The hitch attachment 114 can be secured to the hitch 112, and the implement 116 can be secured to the hitch attachment 114 and set up for use.

In a first example of using the wire rack 118, the hitch attachment 114 can be secured to the hitch 112 and stabilized. Specifically, the end of the body 142 that includes the threaded hole 152 can be inserted in the tubular member 130 of the hitch 112 until the threaded hole 152 of the hitch attachment aligns with the pin hole 132 of the hitch 112. This can be done with the pressure member 182 being drawn into the aperture 170 so that the pressure member 182 does not interfere with the body 142 sliding into the tubular member 130. With the hitch attachment 114 so positioned, the threaded fastener 154 can be inserted through the pin hole 132 and screwed into the threaded hole 152 in the body 142. The threaded fastener 154 can be tightened to pull the body 142 of the hitch attachment 114 toward a side wall of the tubular member 130 of the hitch 112 and inhibit horizontal translation and rotation of the hitch attachment 114 relative to the hitch 112. Additionally, the threaded fastener 174 can be screwed down into the threaded hole 172 to move the pressure member 182 downward to press against the hitch 112, to inhibit vertical translation and rotation of the hitch attachment 114 relative to the hitch 112.

The central support 250 of the wire rack 118 can be positioned so that the bottom of the vertically extending bar 252 slides into the vertically extending sleeve 208 of the hitch attachment 114 with the pin hole 234 of the sleeve 208 aligning with the pin hole 254 in the vertically extending bar 252. Additionally, the threaded fastener 210 can be tightened to secure the wire rack 118 to the hitch attachment 114 and stabilize the wire rack 118 relative to the hitch attachment 114.

The spool axles 310 can be secured to the axle mounts 280. Specifically, the insert section 312 of each axle 310 can be inserted into the corresponding axle mount 280, with the pin hole 314 in the axle 310 aligning with the pin hole 286 in the axle mount 280. With the axle 310 so positioned, the pin 290 can be inserted through the pin hole 314 and pin hole 286. Also, the threaded fastener 292 can be tightened to stabilize the axle 310 relative to the axle mount 280. One or more spools 120 can be slid onto each spool axle 310. A spool stop 330 can be positioned on each spool axle 310 with the flange 334 facing toward a spool 120 that has been slid onto the axle 310, with the pin hole 336 of the spool stop 330 aligning with the pin hole 322 in the axle 310. A spool stop pin 340 can be inserted through the pin hole 336 and the pin hole 322 to secure the spool stop 330 to the axle 310. This spool mounting can be repeated for each of multiple spools 120 and spool axles 310. Thus, the wire rack 118 can allow for spools for dispensing or taking up elongated material such as wires, with the wire rack 118 being stabilized relative to the vehicle hitch 112.

The mounting and use of the vise stand 410 will now be discussed. The vertically extending bar 412 can be slid into and secured to the hitch attachment 114 in the same manner as discussed above for the wire rack 118. This can involve selecting one of the multiple pin holes 414 or 416 of the vertically extending bar 412 to align with the pin hole 234 in the sleeve 208 of the hitch attachment 114. The pin 236 can be inserted through the pin hole 234 and the pin hole 414 or 416. The stem 452 of the mounting plate 450 can be inserted into the top of the vertically extending bar 412, and the threaded fastener 440 can be screwed into the threaded hole 442 to press the stem 452 against the vertically extending bar 412 and stabilize the mounting plate 450 relative to the vertically extending bar 412. The vise 480 can be secured and stabilized relative to the mounting plate 450 in a standard manner, such as by inserting and tightening bolts or other threaded fasteners. Accordingly, the vise stand 410 and hitch attachment 114 of the hitch attachment system 100 can combine to secure and stabilize the vise 480 relative to the vehicle hitch 112.

The hitch attachment system 100 may produce one or more substantial benefits. For example, the hitch attachment can provide different implements 116 that can be used with the same hitch attachment 114. Additionally, the hitch attachment system 100 can stabilize an implement relative to the hitch attachment 114, and relative to the hitch 112. One or more of these benefits can be provided in a hitch attachment system 100 that is easy to use. One or more of these benefits may be provided by all or only a portion of the hitch attachment system 100 discussed above, or with a system having features that are similar to those of hitch attachment system 100. For example, features of the stabilizing system 150 may be used with other implements with or without a separable hitch attachment that can be used with multiple different implements. For example, the features of the stabilizing system 150 could be incorporated into a hitch-mounted bicycle rack without a separable hitch attachment.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently.

While the invention has been particularly shown and described with reference to preferred embodiments thereof, it will be understood by those skilled in the art that various changes in form and details may be made therein without departing from the spirit and scope of the invention. For example, the hitch attachment with the stabilizing system may be configured to be permanently secured to an implement so that the hitch attachment and implement form a single unitary member. As another example, the stabilizing system may be configured so that a female threaded fastener moves to move the pressure member, rather than the male threaded fastener moving to move the pressure member as discussed above. Further, the pressure member may be a part of the moving threaded (female or male) fastener (such as where the pressure member is a circular flange or disc fixed to a moving male or female threaded fastener).

I claim:
1. A hitch attachment system comprising:
a horizontally-extending hollow tubing of a hitch;
a hitch attachment comprising a horizontally extending body that is configured to slide into the horizontally-extending hollow tubing of the hitch, with the hitch attachment comprising a stabilizing system, and the stabilizing system comprising:
a pressure member; and
a threaded member located completely outside the hollow tubing of the hitch and having a head and a threaded portion extending in a linear direction extending away from the head along an axis, with the axis being transverse to the horizontally extending body, and with the threaded member being configured to be actuated to rotate the threaded member around the axis to move a contact area of the pressure member relative to the horizontally extending body in the linear direction, with the threaded member being rotatable relative to the pressure member, and with the stabilizing system being configured such that the movement of the contact area of the pressure member in the linear direction results in the contact area of the pressure member pressing against an inwardly-facing surface of the hollow tubing.

2. The hitch attachment system of claim 1, wherein the axis direction of movement of the threaded member is within 80 degrees of being perpendicular to aligning with the horizontally extending body.

3. The hitch attachment system of claim 1, wherein the pressure member extends from the threaded member and into the hollow tubing.

4. The hitch attachment system of claim 1, wherein the stabilizing system further comprises a female threaded aperture of the hitch attachment that is configured to be positioned within the hollow tubing and a male threaded member that is configured to pass through a hole in the hollow tubing and to engage the female threaded aperture and press the hitch attachment against an inner surface of the hollow tubing.

5. The hitch attachment system of claim 1, wherein the body of the hitch attachment defines a pressure member aperture, and wherein the pressure member is configured to be seated at least partially within the pressure member aperture.

6. The hitch attachment system of claim 5, wherein the pressure member aperture is configured to be positioned at least partially within the hollow tubing.

7. The hitch attachment system of claim 1, wherein the stabilizing system stabilizes the hitch attachment relative to the hollow tubing of the hitch.

8. The hitch attachment system of claim 1, wherein the hitch attachment system further comprises an implement configured to be secured to the hitch attachment.

9. A method of securing a hitch attachment to a vehicle hitch, the method comprising:
sliding a body of a hitch attachment into a horizontally-extending hollow tubing of a vehicle hitch, with the sliding of the hitch attachment moving a female threaded aperture in the hitch attachment into the hollow tubing; and
stabilizing the hitch attachment relative to the hitch using a stabilizing system, the stabilizing of the hitch attachment comprising:
rotating a first threaded member of the stabilizing system so that the first threaded member rotates to move a pressure member of the stabilizing system relative to the body of the hitch attachment in a linear transverse direction relative to a longitudinal axis of the hollow tubing of the hitch and press the pressure member against an inwardly-facing surface of the hollow tubing of the hitch, with the pressure member being attached to the first threaded member and the first threaded member rotating relative to the pressure member, and with the first threaded member being located completely outside the hollow tubing of the hitch during the rotating of the first threaded member, wherein the first threaded member rotates about a rotational axis that extends in a transverse direction relative to the longitudinal axis of the hollow tubing of the hitch;

passing a second threaded member through a hole in the hollow tubing of the hitch; and threading the second threaded member into the female threaded aperture in the hitch attachment, wherein the threading of the second threaded member into the female threaded aperture in the hitch attachment presses the body of the hitch attachment against an inner surface of the hollow tubing.

10. The method of claim 9, wherein the second threaded member presses the hitch attachment against the inner surface of the hollow tubing in a first direction and the pressure member presses the hitch attachment against an inner surface of the hollow tubing in a second direction that is different from the first direction.

11. The method of claim 9, and wherein sliding the pressure member into the hollow tubing slides a portion of the pressure member into the hollow tubing.

12. The method of claim 9, wherein the body of the hitch attachment defines a pressure member aperture, wherein the pressure member is seated at least partially within the pressure member aperture during the sliding of the body of the hitch attachment into the hollow tubing, and wherein stabilizing the hitch attachment comprises moving at least a portion of the pressure member out of the pressure member aperture while the pressure member is at least partially within the hollow tubing.

13. The method of claim 9, wherein the hitch attachment is configured to be permanently secured to an implement.

14. The method of claim 9, wherein the rotational axis is within five degrees of being perpendicular to the longitudinal axis of the hollow tubing of the hitch.

15. A method of securing a hitch attachment to a vehicle hitch, the method comprising:

sliding a body of a hitch attachment into a horizontally-extending hollow tubing of a vehicle hitch; and stabilizing the hitch attachment relative to the hitch using a stabilizing system, the stabilizing of the hitch attachment comprising rotating a threaded member of the stabilizing system so that the threaded member rotates relative to a pressure member of the stabilizing system, to move a contact area of the pressure member in a linear direction relative to the body of the hitch attachment, with the linear direction being transverse to the horizontally-extending hollow tubing, resulting in the contact area of the pressure member pressing against an inwardly-facing surface of the hollow tubing while the pressure member extends from an area of the pressure member that is outside the hollow tubing to the contact area inside the hollow tubing; and wherein the threaded member is located completely outside the hollow tubing of the hitch.

16. The method of claim 15, wherein the pressure member is secured to the threaded member.

17. The method of claim 16, wherein the linear direction is within ten degrees of being perpendicular to a longitudinal axis of the hollow tubing of the hitch.

18. The method of claim 15, wherein the threaded member is a first threaded member, and wherein the method further comprising passing a second threaded member through a hole in the hollow tubing of the hitch, and threading the second threaded member into a female threaded aperture in the hitch attachment, the sliding of the body of the hitch attachment moving the female threaded aperture into the hollow tubing, wherein the threading of the second threaded member into the female threaded aperture in the hitch attachment presses the hitch attachment against an inner surface of the hollow tubing.

19. The method of claim 18, wherein the second threaded member presses the hitch attachment against the inner surface of the hollow tubing in a first direction and the pressure member presses the hitch attachment against an inner surface of the hollow tubing in a second direction that is different from the first direction.

* * * * *